Dec. 30, 1952 R. F. MOORE 2,623,413
MACHINE FOR ASSEMBLING AND TRYING OUT DIES
Filed Dec. 31, 1947 9 Sheets-Sheet 1

INVENTOR.
RICHARD F. MOORE
BY
John F. Hanrahan
ATTORNEY

Dec. 30, 1952     R. F. MOORE     2,623,413
MACHINE FOR ASSEMBLING AND TRYING OUT DIES
Filed Dec. 31, 1947     9 Sheets-Sheet 3

INVENTOR.
RICHARD F. MOORE
BY
John A. Hanrahan
ATTORNEY

Dec. 30, 1952            R. F. MOORE            2,623,413
MACHINE FOR ASSEMBLING AND TRYING OUT DIES
Filed Dec. 31, 1947            9 Sheets-Sheet 5

INVENTOR.
RICHARD F. MOORE
BY
John J. Hanrahan
ATTORNEY

Dec. 30, 1952 R. F. MOORE 2,623,413
MACHINE FOR ASSEMBLING AND TRYING OUT DIES
Filed Dec. 31, 1947 9 Sheets-Sheet 6

INVENTOR.
RICHARD F. MOORE
BY
John Hanrahan
ATTORNEY

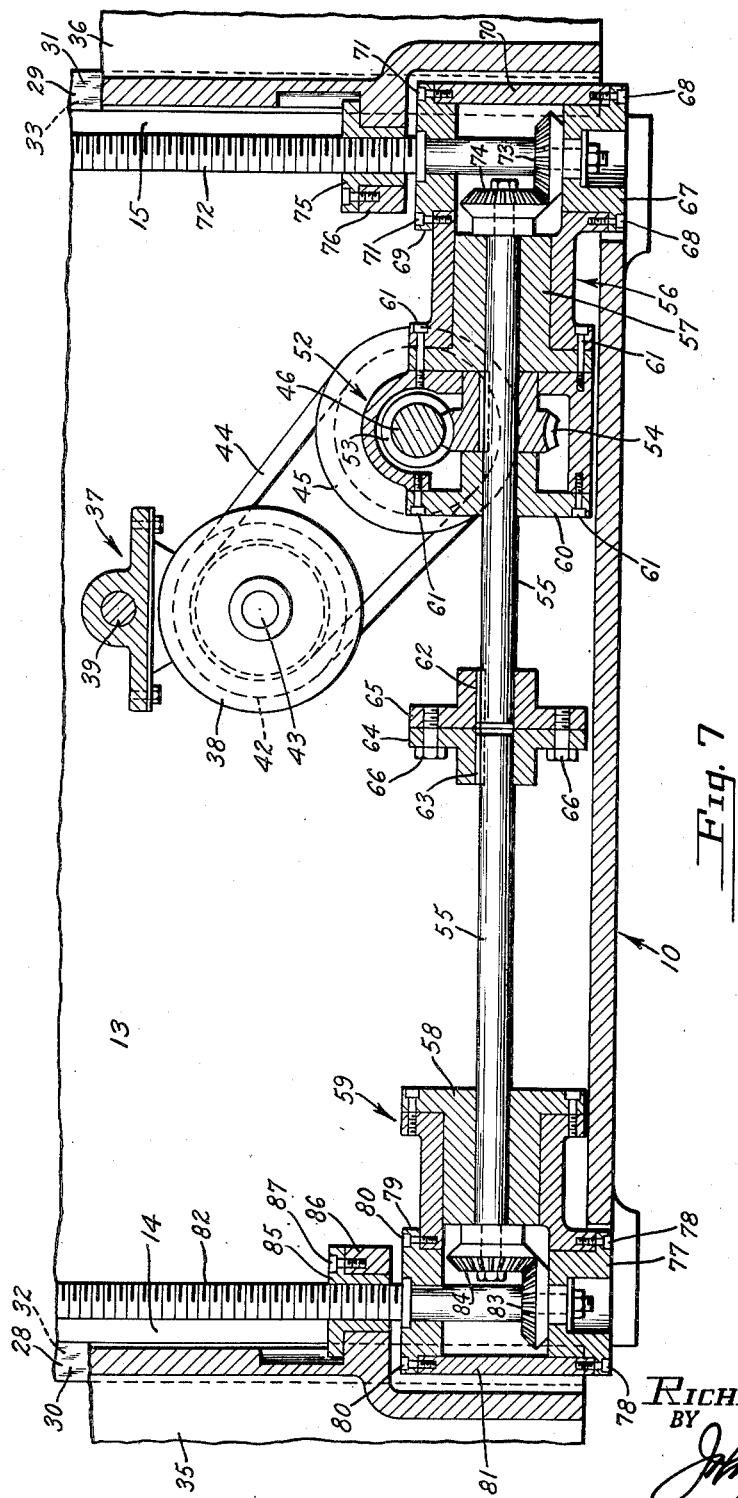

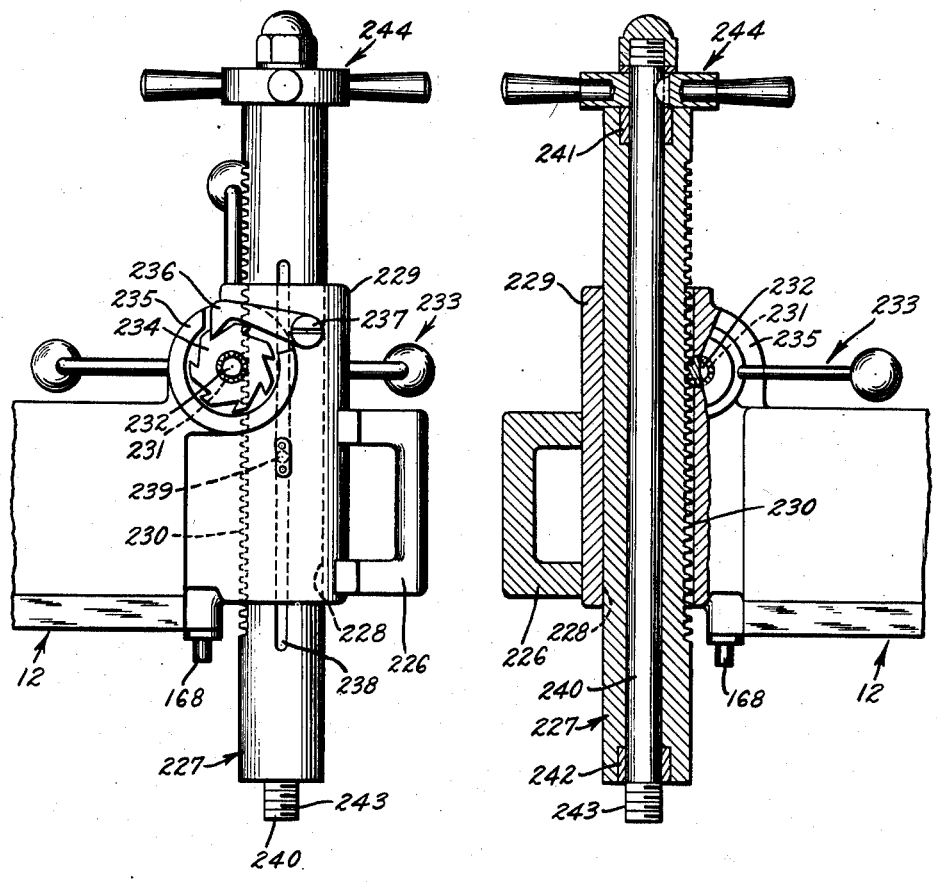

Patented Dec. 30, 1952

2,623,413

UNITED STATES PATENT OFFICE 2,623,413

MACHINE FOR ASSEMBLING AND TRYING OUT DIES

Richard F. Moore, Trumbull, Conn., assignor to Moore Special Tool Co. Inc., a corporation of Connecticut Application December 31, 1947, Serial No. 794,985

37 Claims. (Cl. 76—4)

This invention relates to new and useful improvements in tool room equipment and has particular relation to an apparatus for use in the trying out and assembling of dies.

An object of the invention is to provide a machine especially adapted for use in assembling and trying out dies, the machine including various features for use in either of these operations and particularly including means whereby a minimum of manual effort and a minimum of time is required in the carrying out of such operations.

Another object is to provide a machine including a supporting surface to which the bed of a die set may be secured and including an elevating mechanism to which the punch holder of the die set may be secured, said machine including power means for the raising and lowering of said elevating mechanism and thereby raising and lowering the punch holder of a die set in exact alignment with a die bed secured to said supporting surface.

Another object is to provide a machine including separate means to which the die bed and the punch holder, respectively, of a die set may be secured, said machine including means whereby one of the first means may be moved relative to but in predetermined alignment with the other thereof whereby to move one of the bed and punch holder of a die set relative to but in predetermined alignment with the other thereof.

Another object is to provide a machine including means to which the bed of a die set may be anchored and a movable platen to which the punch holder of said die set may be anchored together with means for applying rectilinear movement to the platen whereby to move said punch holder relative to the bed of the die set and the machine further including means whereby said platen may be turned on an axis at right angles to said direction of rectilinear movement for exposing the punch mounting side of said punch holder.

An additional object is to provide a machine including the features above outlined and also including means for drilling or tapping or otherwise working upon the members of the die set mounted in the machine.

Another object is to provide a machine having the characteristics stated and including mechanism adapted to be used in the manner of a crane for lifting and shifting the punch holder of a die set to a position away from the bed of a die set leaving such bed exposed to allow freedom for the performance of any necessary operations thereon.

Yet a further object is to provide a machine having the characteristics stated and including a beam-like arm mounting at one end a chuck adapted to receive drills, taps, or the like, and means for driving said chuck at various speeds, said arm being mounted for rectilinear and rotary movement to dispose such chuck over various parts of a die set mounted in the machine.

Yet another object is to provide a machine having the characteristics enumerated and including various features of construction especially adapting the machine for tool room use and providing a machine of great stability and long useful life and which machine is adapted for a high degree of accuracy in the performance of its various functions.

Other objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 7 is a longitudinal sectional view taken as along the line 7—7 of Fig. 5;

Fig. 10 is an enlarged side elevational view of the rear portion of the beam or arm of the machine, the view being taken looking at the same side of said arm as that shown in Fig. 1; and Fig. 11 is a view taken from the opposite side of the machine, the view being partly in side elevation with parts broken away to show details of construction.

Figure 1:
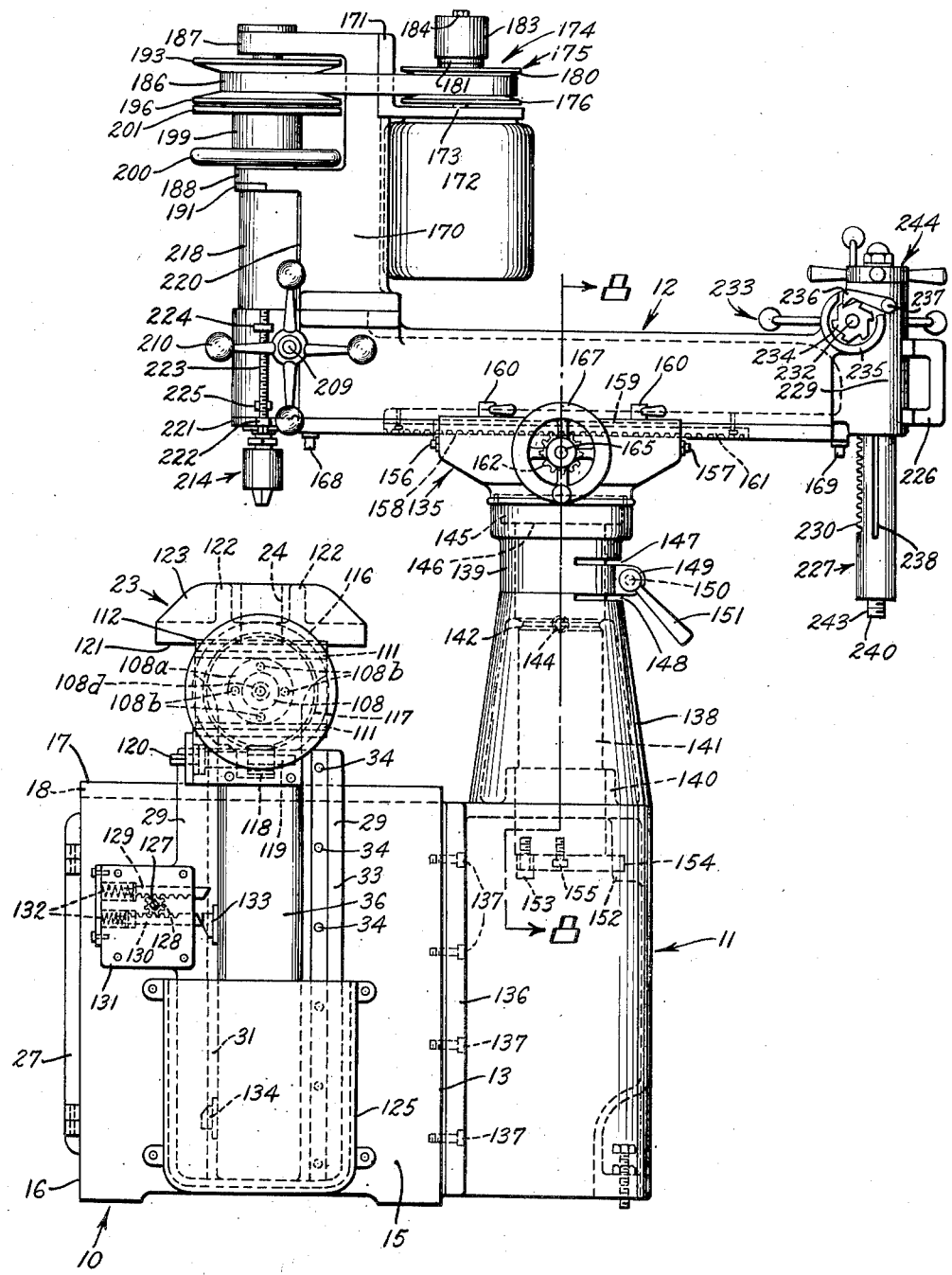
Fig. 1 is a side elevational view showing a machine constructed in accordance with the invention.

Referring in detail to the drawings, the machine of the invention as here disclosed includes a base casting generally designated 10, to the mid portion of the rear side of which is bolted or otherwise fixed an upright or post generally designated 11 and which post mounts an arm or beam 12 for turning movement about a vertical axis and for a horizontal movement in the direction of its own length. The beam 12 and the mechanisms mounted thereon and later to be described in detail, function in the nature of a radial drill as will appear.

Base 10 comprises a hollow casting including a rear wall 13, end walls 14 and 15, a front wall 16 and a relatively heavy top wall 17 provided with a suitable number of T-slots 18. In addition, this wall 17 may be provided over its surface with a large number of tapped openings and in such event either the slots 18 or the selected ones of said openings are to be used to receive securing means, as bolts, for anchoring the bed of a die set in the desired position on the upper surface of said wall 17.

In the drawings, the bed 19 of a die set is shown by broken lines as secured to the upper surface of the wall 17 by means of T-bolts 20 having their heads located in the transversely extending T-slots 18. Also, in the drawings (see especially Fig. 2) the die bed 19 is provided with any or the usual guide pins 21 on which are mounted a punch holder 22 of a die set. This punch holder is anchored to a platen generally designated 23 and suitably mounted, as will be described, for movements relative to the base 10. The punch holder 22 is also shown by broken lines.

The manner in which the punch holder is secured to the platen is not material and will, of course, vary. Where the punch holder is of the type having a central stud, said stud is received and secured in an opening 24 provided in the platen for that purpose. Other types of punch holders may be secured with straps, clamps or the like, as is most convenient in any particular instance.

Figure 5:
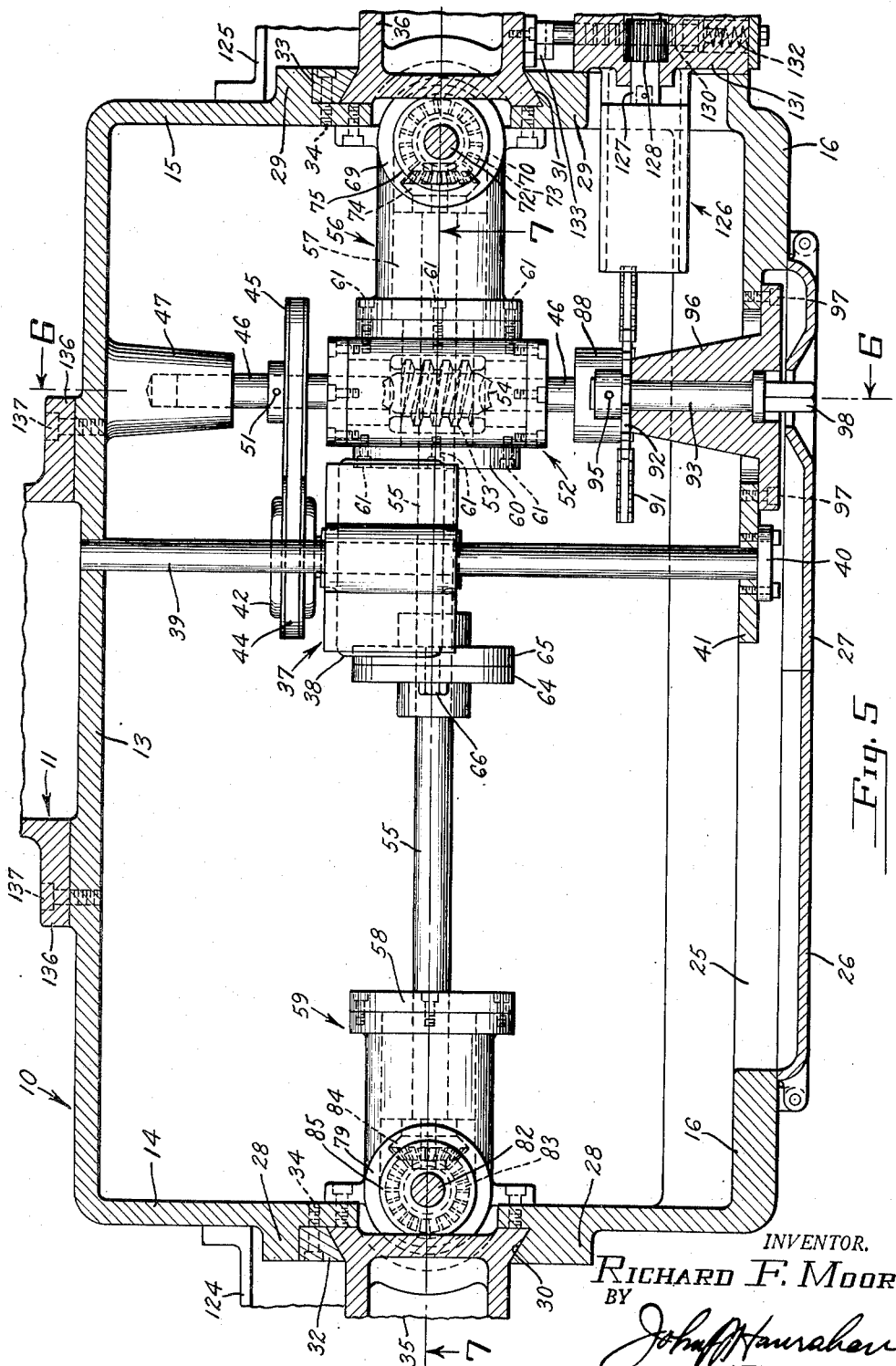
Fig. 5 is an enlarged sectional view taken as along the line 5—5 of Fig. 2.

Base casting 10 is hollow and in its front wall 16 is provided with a rather large opening 25 normally closed by hinged doors 26 and 27. The mechanism for raising and lowering the platen 23 is located within the base 10. To the desired end, the end walls 14 and 15 of said base are thickened in their vertically extending mid portions as at 28 and 29 (see Fig. 5), such thickened portions are provided with undercuts establishing dove-tailed ways 30 and 31. The respective vertical ways 30 and 31 are completed by suitably shaped gibs or gib-like members 32 and 33, respectively, held in place as by machine screws 34 or other suitable means. These ways receive the inner dove-tailed portions of a pair of vertical posts 35 and 36 whereby said posts are mounted for vertical sliding movement on the base 10. Any such movements will, of course, be guided by the ways 30 and 31 in which the posts are movable.

At their upper ends and in a manner to be described, the posts 35 and 36 mount the platen 23. Within the base 10, a bracket 37 mounts an electric motor 38. Said bracket 37 is preferably mounted in a rod or bar 39 extending transversely of the machine and mounted at one end in the rear wall 13 of the base and at its other end secured by a cap device 40 to an extension 41. Such extension 41 is actually a part of the front wall 16 of the base and extends across a considerable portion of the hinged door 27 at the front side of the base.

Bracket 37 being mounted on the bar or rod 39, it will be clear that the bracket is fully supported and that any slight adjustments necessary to align the parts in the assembly of the machine may, insofar as the bracket 37 is concerned, be very easily made. A pulley 42 on the shaft 43 of motor 38, through a V-belt or other suitable means 44, drives a pulley 45 on a shaft 46 extending parallel with the pulley shaft 43 and with the rod or bar 39 and located laterally of such parts and at a point lower in the machine's structure.

Figure 6:
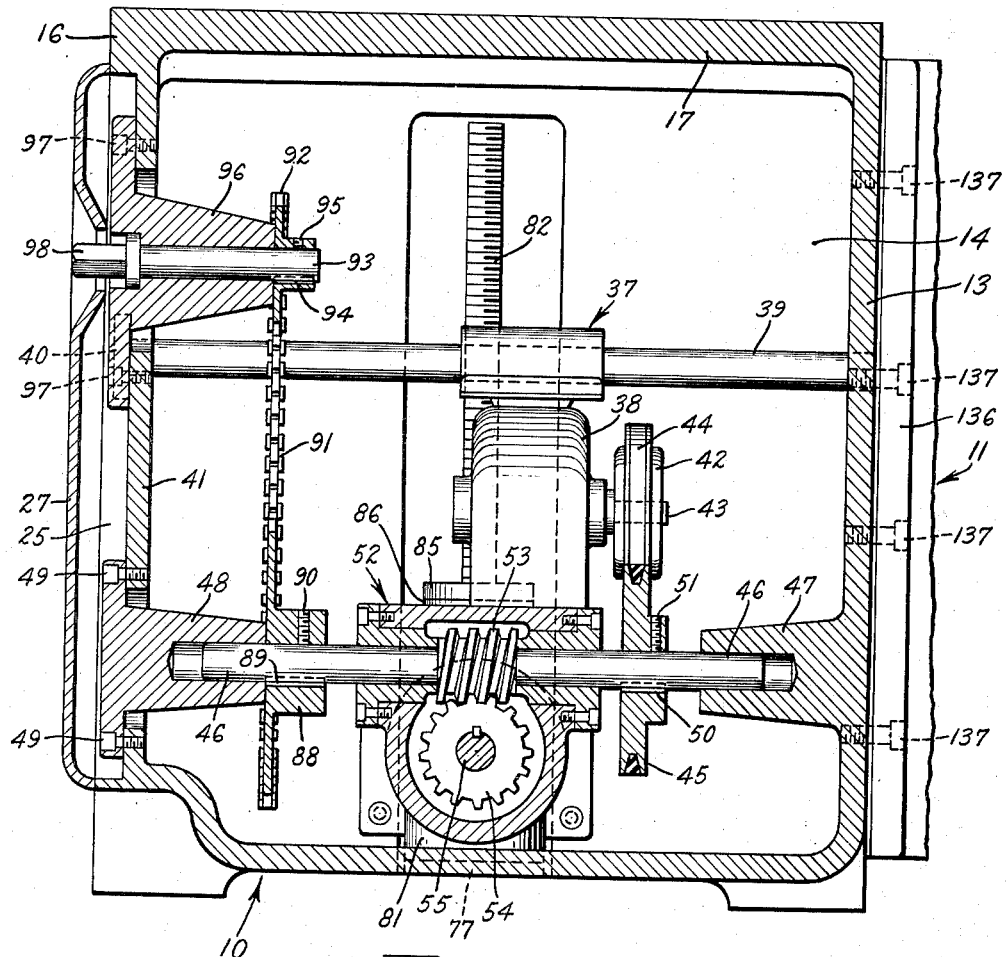
Fig. 6 is a transverse sectional view taken as along the line 6—6 of Fig. 5.

The shaft 46 (see Fig. 6) has bearing in an element 47 shown as cast integral with the rear wall 13 of the base and in a bearing element 48 extending through and anchored on the extension 41 as by machine screws 49. Pulley 45 is secured to the shaft 46 as by a key 50 and a set screw 51. Shaft 46 passes through a bearing structure 52 and therein mounts a worm 53 meshing with and driving a worm gear 54 keyed or otherwise made rigid with a longitudinally extending shaft 55. It will be understood that the worm 53 is rigid with the shaft 46 so as to turn therewith and drive the gear 54 and thus the shaft 55.

Bearing structure 52 is mounted at the inner side of and is anchored to a bearing structure 56 (see Fig. 7) including an inner bearing element 57 forming a support for one end of the shaft 55. The other end of said shaft has bearing support in an inner bearing member 58 of a bearing structure generally designated 59 and of the same or substantially the same construction as that of the bearing structure 56. The worm gear 54 is located between the inner end of the bearing element 57 and a combined closure and bearing element 60 and constituting a portion of the structure generally designated 52, the parts being secured together as by the machine screws 61.

The shaft 55 is actually in two sections, the adjacent ends of said sections being keyed as at 62 and 63 to coupling elements 64 and 65. These elements are shown as secured together as by bolts 66. The purpose of this construction is to permit of alignment and adjustment of the parts, including gears, at the outer ends of said shaft sections in the initial set-up of the machine. Thereafter, the coupling elements 64 and 65 are secured together by the bolts or screws 66 and from thence the shaft 55 functions as though it were one solid piece, the two sections thereafter operating as a single piece.

A box-like bearing structure (see Fig. 7) is located at each end of the shaft 55, such structures being associated with the bearing structures 56 and 59, respectively. Referring specifically to the box-like bearing structure associated with the bearing structure 56, the same comprises a lower bearing element 67 held in place as by screws 68 and an upper bearing element 69 vertically spaced from the element 67, the space between said elements being closed partly by the bearing structure 56 and the remainder of said space being enclosed by closure means 70.

Machine screws 71 are shown as anchoring the upper bearing element 69 in place. These bearing elements 67 and 69 mount a lead screw 72 for rotary movement about a vertical axis. Within the box-like bearing structure referred to, the lead screw 72 has secured thereto a bevelled gear 73 with which meshes a bevelled gear 74 fixed to the adjacent end of the longitudinally extending shaft 55. With this construction, it will be apparent that whenever the shaft 55 is being rotated about its axis, the lead screw 72 will be rotated about its axis.

Lead screw 72 has threaded engagement with a nut or collar 75 fixed in a lug-like extension 76 projecting from the inner side of the vertical post 36. As the nut 75 is incapable of turning movement in the extension 76, it will be clear that as the lead screw 72 is rotated, the nut will attempt to feed along the screw and being rigid with the post 36, vertical movement will be imparted to said post. In the use of the machine, the connections described are used for raising and lowering the post 36 as occasion demands and while the structure has not as yet been described for raising and lowering the post 35, it will be understood that the posts 35 and 36 are always moved in unison.

The structure for raising and lowering the post 35 is best illustrated towards the left in Fig. 7. That structure includes a lower bearing element 77 held in place as by machine screws 78 and an upper bearing element 79 held in place as by machine screws 80. The space between such elements is closed in part by the bearing structure 59 and the remainder of said space is closed by means 81. In this box-like bearing structure, a lead screw 82 has anchored thereto a bevelled gear 83 constantly meshing with a bevelled gear 84 fixed on the adjacent end of the shaft 55. Thus, it will now be clear that when the motor 38 is operating and driving the shaft 46, the latter will, through the worm 53 and worm gear 54, drive the shaft 55. That shaft being geared to the lower end portions of the lead screws 72 and 82, such lead screws will necessarily be driven.

The lead screw 82 is rotatably mounted by bearing elements 77 and 79 and passes upwardly through a nut or nut-like device 85 secured rigidly to a lug-like extension 86 of the post 35 as by machine screws 87. Since the nut or nut-like means 85 is incapable of turning relative to the lug 86, it will be understood that turning of the lead screw 82 will result in vertical feeding of said nut or nut-like means and thus of vertical movement of the post 35. Now, it will be clear that when the motor 38 is energized, power means is set into operation for vertically moving the posts 35 and 36 in unison.

When making a set-up it is desirable to try out the tool equipped die set and for this purpose means are provided for manually moving the posts 35 and 36 whereby their movement is at reduced speed and more under control of the operator so that the movement may be stopped instantly if it appears there is any jamming of the tools or the like. For this purpose, (see Figs. 5 and 6) a sprocket 88 is secured to the shaft 46 as by a key 89 and set screw 90 and trained over such sprocket is a chain 91 also trained over a sprocket 92 fixed to a stud shaft 93 by a key 94 and set screw 95. The short shaft 93 is mounted for turning movement only in a bearing device 96 extending through and fixed to the base extension 41 as by machine screws 97.

Actually, the outer end of the shaft 93 projects through the door 27 and is shown as provided with a squared end portion 98 adapted to receive any suitable crank for manual turning of the shaft. Clearly, the shaft end 98 need not be square but may be shaped as desired to receive a tool whereby the shaft may be manually turned to function through the described sprockets and chain 91 to turn the shaft 46 and thence the worm 53 and worm gear 54 turning the shaft 55 to move the posts 35 and 36 vertically.

Figure 2:
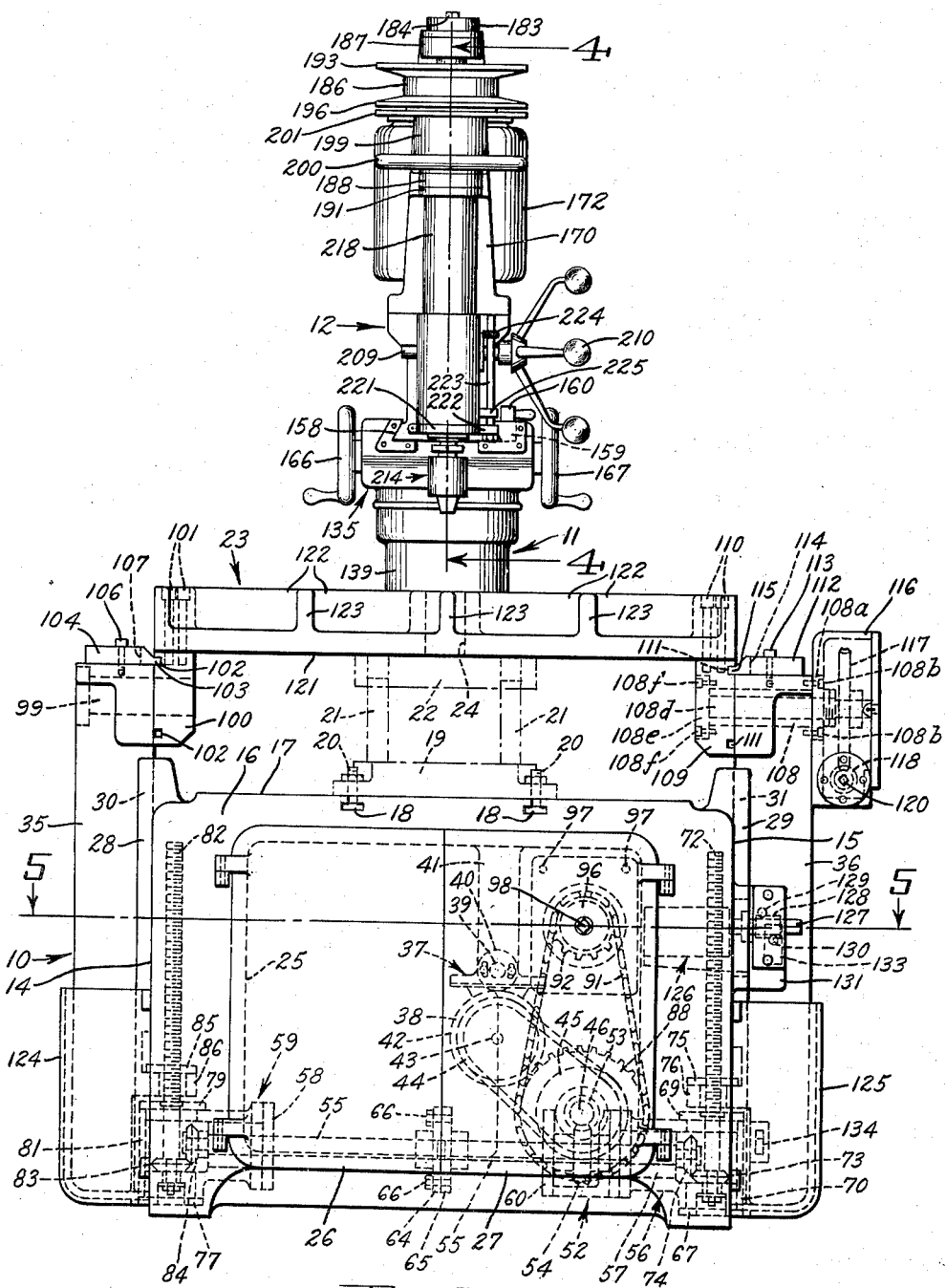
Fig. 2 is a front elevational view of said machine.
Figure 3:
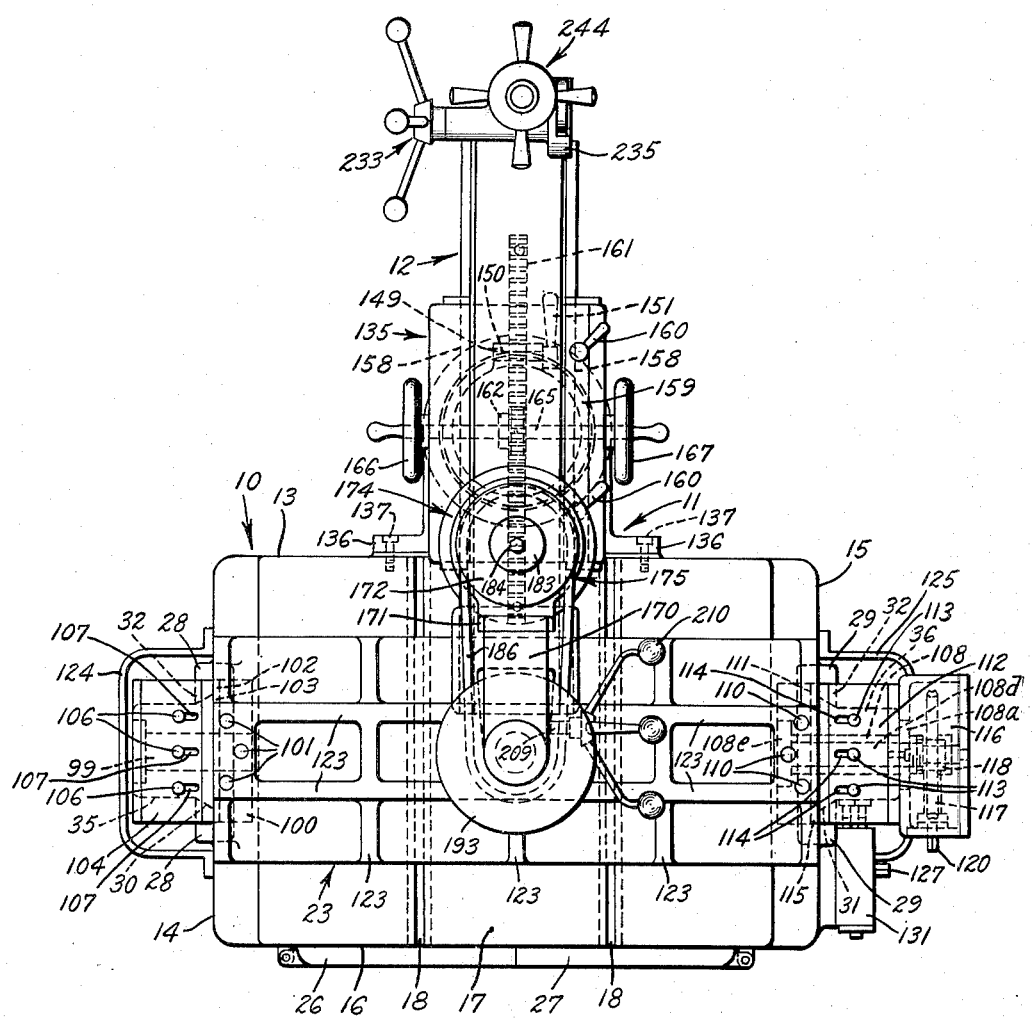
Fig. 3 is a top plan view thereof.

Mounted by and extending from the inner side of the upper end portion of the post 35 is a relatively heavy but short shaft or bearing element 99, (Figs. 2 and 3). Turnable with or on this element is a block 100 projecting from the underside of the adjacent portion of the platen 23. Block 100 is rigid with the platen and may be integral therewith or secured thereto and in the drawings, the block is shown as secured to the platen by machine screws 101. At spaced points on its outer side, block 100 is provided with recesses 102 adapted to receive the reduced inner end portion 103 of a latch device or keeper 104 slidable on the upper end of the post 35. Bolts 106 passing through slots 107 in said keeper 104 guide movement of the same and it will be understood that when one of the recesses 102 is opposite the reduced end portion 103 of the keeper, the latter may be pushed inwardly so that said reduced portion enters said recess (see Fig. 2).

The block 100 and thereby the platen 23 may thus be held against turning movement with or on the short heavy shaft or pivot means 99. At this time, the bolts 106 may be tightened. When the keeper 104 is shifted in the opposite direction as permitted by the slots 107, the reduced portion 103 of the keeper will be removed from any one of the recesses 102 and therefore, insofar as the keeper 104 is concerned, the block 100 and the platen 23 are free to turn with or on the short heavy pivot member 99.

Extending inwardly through the upper end of the post 36 is a hollow shaft or sleeve 108 provided with an annular flange 108a rigidly secured to said post through said flange by screws 108b. A solid shaft 108d provided with an annular flange 108e extends through a block 109 and the hollow shaft 108 and is secured integrally to the block by screws 108f passing through said flange. The block 109 is located at the inner side of post 36 and is integral with or otherwise secured to the adjacent end of the platen 23.

In the drawings (see Fig. 2) said block 109 is secured to the platen as by machine screws 110. In its outer side, block 109 is provided with recesses 111 (corresponding with the recesses 102 of the block 100) and slidable on the upper end of the post 36 is a keeper 112 held in place as by screws 113 passing through slots 114 therein. The reduced inner portion 115 of said keeper is adapted to be located in one of the recesses 111 to lock the block 109 and thus the platen 23 against movement relative to the post 36.

At the outer side of said upper portion of the post 36, a housing 116 encloses a worm gear 117 fixed to the outer end of the shaft 108d and meshing with a worm 118, the shaft 119 of which has its outer end 120 (Fig. 1) squared or otherwise shaped to receive a crank or other hand suitable tool. With this described construction it will be understood that when the keepers 104 and 112 are drawn outwardly removing their portions 103 and 115 from the recesses 102 and 111 of the blocks 100 and 109, respectively, turning of the shaft 118 by a crank or other suitable tool applied to the shaped end 120 of said shaft will result in rotation of the shaft 108d (fixed to the block 109) and thus will result in turning of the blocks 100 and 109 on their pivots 99 and 108d in a manner to swing the platen 23 about an axis represented by the center lines of said pivots.

Such center lines, it will be understood, are in alignment whereby the blocks and platen may swing freely or without binding. Also, it will be understood that when the keepers 104 and 112 are retracted to remove them from the recesses 102 or 111, turning of the shaft 118 will result in swinging of the platen 23 to any desired position as it may be moved through the entire 360 degrees of a circle.

When the platen is in the desired position, as for example that shown in Fig. 2, the keepers 104 and 112 are shifted inwardly to engage recesses 102 and 111 and lock the blocks 100 and 109 and thus the platen 23 in this position of adjustment. It will also be understood at this time the crank or other tool may be removed from the squared end 120 of the shaft 119 and that, if desired, the crank or some crank-like tool may be permanently fastened to said shaft.

Platen 23 is shown as a casting having a flat under surface 121 against which a punch holder may be secured and on its upper side is provided with longitudinally and transversely extending re-inforcing ribs 122 and 123, respectively. Preferably, this platen is made quite heavy and rigid and the blocks 100 and 109 are also quite heavy and rigid and are rigidly mounted as vibration is to be avoided insofar as possible. In their lower ends, posts 35 and 36 extend into boot-like devices 124 and 125 bolted or otherwise secured to the end walls of the base casting 10.

Within the base 10 is a limit switch 126 (Figs. 2 and 5) for the motor 38. This limit switch includes a shaft 127 on which is mounted a pinion 128. Said pinion is located between a pair of latch-like devices 129 and 130 (see Fig. 1) located in a housing 131 on the outer side of the end wall 15 of the machine. Latches 129 and 130 are in the form of racks as they have teeth on their opposing edges, which teeth mesh with those of the pinion 128. Against the inner ends of the latches 129 and 130 are small coil springs 132 constantly urging said latches forwardly. It will be noted particularly in Fig. 2, that the latches 129 and 130 are offset so that they are not in vertical alignment.

On the forward edge of the post 36 and spaced vertically are a pair of dogs or trips 133 and 134. Such dogs or trips are also offset laterally whereby the dog 134 is in vertical alignment with the latch 129 and the dog 133 is in vertical alignment with the latch 130. Clearly, the springs 132 are alike and each is thrusting forwardly on its latch 129 or 130 as the case may be. Further, it will be clear that these latches will not move without imparting motion to the pinion 128 and hence to the shaft 127.

Normally, the latches 129 and 130 are balanced in a retracted position at which time the switch 126 is in "off" position. If, at this time, it is desired to raise the platen 23, the operator applies a key (not shown) to the outer end of the shaft 127 and gives it a partial turn in one direction. This closes the switch 126 to an "on" position to have motor 38 operate in a direction to rotate the lead screws 72 and 82 to feed the posts 35 and 36 upwardly. At this time, either the latch 129 or the latch 130 will be projected forwardly and actually as the feed is upwardly, the latch 129 will be projected forwardly. The posts are raised carrying the platen 23 with them until the dog or trip 134 strikes the latch 129 pushing the same inwardly of the housing 131. Such movement of the latch imparts a turning movement to the pinion 128 whereby shaft 127 is turned in a reverse direction and switch 126 opened.

At this time, vertical movement of the posts 35 and 36 ceases. Now to lower the platen 23, the operator turns the key in the opposite direction turning the pinion 128 in the opposite direction and closing the switch 126 to operate the motor in the opposite direction whereby the drive is to lower the posts 35 and 36 and the platen 23. The mentioned use of the key by the operator has now projected the latch bar 130 and at the end of the downward movement, the dog or trip 133 will engage said latch 130 and push it inwardly turning the pinion 128 and thus the shaft 127 back and again opening the switch 126.

From the foregoing, it is to be understood that through manual turning of the shaft 127, the operator may stop the machine at any time or at any position of the posts 35 and 36 and he may start the machine to move such posts in either direction at any time. However, the limits of movement are determined by the trips or dogs 133 and 134 whereby the posts will not be moved to their extreme downward position with the motor energized or whereby the posts will not be moved beyond an extreme upper position to result in damage to the machine.

Generally, when using the machine to try out a set of tools, the operator will throw the switch 126 to feed the platen downwardly carrying the punch holder 22 downwardly. At this time, the openings in the punch holder will of course be aligned with the guide pins 21 of the die set and openings for these pins may be provided in the platen. As the tools approach active or operative position, the operator stops the power drive and then applies his crank to the end 98 of the shaft 93 to lower the platen and thus the punch holder and tools manually. Because of the gearing employed and the ratio of the sprockets 92 and 88, etc., a complete rotation of the shaft 93 results in an extremely slight downward movement (or if the rotation of shaft 93 is in the opposite direction, upward movement) of the platen. Thus, the operator may manually "ease" the tool carrying punch holder toward the bed 19 of the die set, making sure that all parts properly register or align.

The mechanism thus far described is useful for the separation of the bed and punch holder of heavy die sets and also for the trying out or testing of tools mounted in or on a die set. Thus, a die set is disposed on the upper surface of the wall 17 of the base and the bed 19 of the die set is bolted, strapped or in any other suitable manner secured against said surface. Then the platen 23 has the punch holder 22 of the die set secured thereto. The punch holder may be anchored by having its stem secured in the opening 24 of the die set or the punch holder is in any other suitable manner clamped, bolted or otherwise fastened to the platen.

At this time, the punch holder is aligned with the bed 19 of the die set, the punch holder being on the guide pins 21 of the die set. In the case of a large or heavy die set, it is a difficult job separating the punch holder from the bed and frequently there is injury to the workman, such as pinched fingers, mashed toes, or the like. Also, with a large die set, not infrequently more than one man is required to separate the bed and punch holder. Further, after these parts have been separated and tools mounted, the parts must be brought together again from different parts of the shop and great care exercised in again mounting the punch holder on the guide pins of the die set. This requires much time and a great deal of physical effort where the parts are large.

With the mechanism thus far described, the die set being mounted as above set forth, the operator merely applies his key to the shaft 127 to close the switch 126 and have the motor 38 drive the posts 35 and 36 upwardly carrying the platen with the posts. The punch holder being fixed to the platen, the punch holder is drawn upwardly on or off the guide pins of the die set. Thus, we have power means for separating the punch holder and bed of a large and heavy die set. The punch holder and bed of the die set having been separated, the operator can apply his crank to the squared end 120 of the shaft 119 whereby to turn the worm 118 and through it the worm wheel 117 to rotate the shaft 108d and swing the platen on an axis represented by the axis of said shaft and of the short heavy pivot shaft 99.

The platen may be swung through the desired part of a circle and generally will be swung upwardly to 180 degrees, and thus inverted so that the underside of the punch holder will be exposed at the upper side of the platen and the operator may work on it by looking down at it from a comfortable position rather than trying to work on it looking upwardly at it. The platen need not be swung through 180 degrees but can be swung to the position desired by the operator to expose the underside of the punch holder. It will be understood that the keys 104 and 112 were withdrawn from the slot-like openings 102 and 111 in the blocks 100 and 109 to permit of swinging of the platen as described.

After the platen is swung through 180 degrees then the keys are moved inwardly again to dispose their reduced portions in the other slot-like recesses of the mentioned blocks 100 and 109 to lock the platen in its new position. Rather than have slot-like recesses at 102 and 111 and having the flat key portions to enter such slots, pins may be used and a series of holes provided to lock the platen in a swung position less than 180 degrees from that in which it is shown in Figs. 1 and 2.

Figure 8:
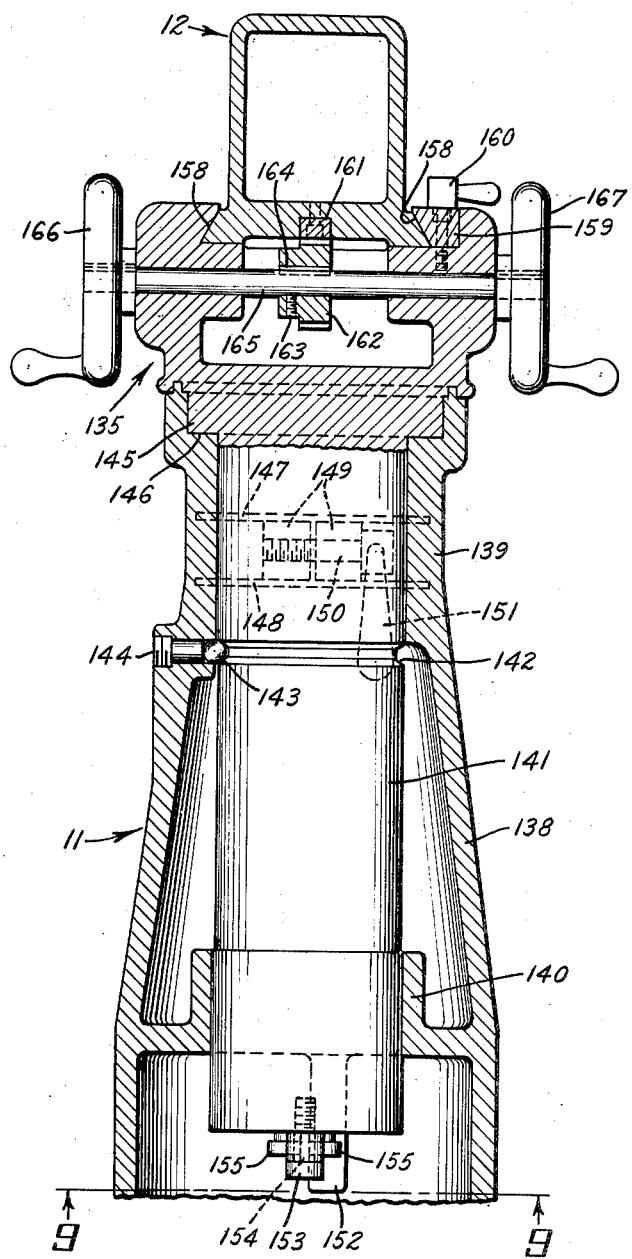
Fig. 8 is an enlarged vertical sectional view taken as along the line 8—8 of Fig. 1.

The vertical casting 11 is a hollow tubular structure at its upper end mounting a head-like structure 135 for turning movement about a vertical axis. Casting 11 includes side flanges 136 secured to the rear wall 13 of the base casting as by machine screws 137. Flanges 136 are of a height about equal to that of the wall 13 and above such flanges the casting 11 is shown as including a hollow tapered portion 138 and a circular upper end portion 139. Within the casting and a considerable distance beyond the upper end thereof, a bearing structure 140 is formed, such structure interiorly aligning with the interior surface of the tubular portion 139 whereby said interior surfaces form bearings for the mounting of a heavy shaft 141, which actually carries the head 135 and is shown (see Fig. 8) as integral therewith.

The heavy shaft 141 is provided with a groove 142 in which a ball 143 is held as by a plug 144 whereby vertical movement of the shaft in the casting 11 is prevented although turning movement of the shaft is not at all interfered with. At the juncture of the shaft and head 135, an annular shoulder 145 is provided and such shoulder rests on a shoulder 146 provided interiorly at the upper side of the tubular portion 139 of the casting 11. In this way, the head 135 is mounted against downward movement due to the bearing provided by the shoulders 145 and 146 and against upward movement by the ball 143 and the various annular bearing surfaces provide for turning movement of the shaft 141 on its own axis.

In its rear portion, the tubular portion 139 of the casting 11 is slotted as at 147 and 148 (see Fig. 1) providing a pair of tongue-like portions 149 connected as by a bolt 150 onto the stem of which is threaded a hand piece 151. When the head 135 is to be adjusted radially, the hand piece 151 is loosened and the desired adjustment is made and thereafter this hand piece is tightened acting on the bolt 150 to draw the clamping members or ears 149 toward one another whereby to have the portions between the slots 147 and 148 bite or grip the shaft 141 and lock it and thereby the head 135 in the desired position of rotary adjustment.

As will later appear, an electric motor mounted on the arm or beam 12 will have leads connected thereto. To prevent such leads from becoming hopelessly entangled or damaged, means are provided whereby the shaft 40 may not be turned through a complete circle but in its turning movement about its own axis is limited to something less than 360 degrees. To the desired end, a stop 152 (see Figs. 8 and 9) in the form of a lug, is provided on the inner surface of the casting 11 below the bearing 140. An anchoring bolt 153 serves to attach one end of a heavy or stiff leaf spring 154 to the lower end of the post or column 141 and such spring has a free end portion projecting beyond the posts in position to engage the lug 152.

Figure 9:
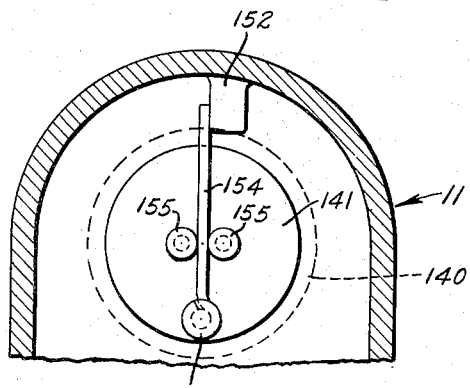
Fig. 9 is a detail sectional view taken as along the line 9—9 of Fig. 8.

Stops or limiting devices 155 may be carried by the posts at the respective sides of the leaf spring. With this construction, it will be seen that when the projecting end of the spring 154 is against one side of the stop lug 152 (see Fig. 9) the post 141 has turned to the limit of its movement in one direction. It may now be turned in the opposite direction (counterclockwise as seen in Fig. 9) until the projecting end of the spring engages the opposite side of the stop lug 152. Because of the employment of the resilient spring 154, the turning movement of the post 141 (and the parts carried thereon) is not brought to a sudden jarring stop but is yieldingly stopped at the limit of its movement.

The thickness of the stop 152 represents the amount less than 360 degrees through which the head 135 and parts thereon may be rotated. This will prevent winding up of the leads for the motor about the head or other parts. Since that is the only purpose of the stop disclosed, the lug is preferably kept fairly thin so that the head 135 and parts thereon may be rotated through as large an arc as possible.

The head 135 is shown as somewhat elongated and at its respective end walls the same is equipped with stops 156 and 157 (Figs. 1 and 4) and in its upper wall such head is provided with ways 158 (Fig. 8) extending in the direction of the length of the head. One side of said ways, which are undercut or dove-tailed, is actually formed in the head and the other side is represented by a bar 159 held in place by clamping device 160. In such ways, the beam 12 is mounted for longitudinal movement. To the desired end, on its underside such beam has a rack bar 161 fixed thereto and meshing with such rack bar are the teeth of a gear 162 fixed as by a screw 163 and a key 164 to a shaft 165 extending transversely of the head 135 and adapted for turning movement therein.

The shaft 165 extends entirely through the head 135 and at its respective ends has hand wheels 166 and 167 rigidly fastened thereto. With this construction, it will be understood that on loosening of the clamping devices 160 and the turning of either the hand wheel 166 or the hand wheel 167 (depending on which is convenient to the operator) the beam 12 may be shifted longitudinally or along the ways 158. When any desired longitudinal adjustment of the beam is made, the clamping devices 160 are tightened to draw the gib-like member 159 down against a portion of the beam to secure it in this adjusted position. Stops 168 and 169 on the lower side of the beam 12 are adapted for engagement with the stops 156 and 157, respectively, on the head 135 to limit longitudinal adjustment of the beam 12 with respect to said head.

On the upper forward portion of the beam 112 is secured a casting 170 (see Figs. 1 and 4) to the rear side of which is bolted or otherwise secured a casting or bracket 171 mounting a commercial reversible two-speed electric motor 172. On the shaft 173 of this motor is a variable speed drive device 174 including a pulley 175 comprising a slightly cone-like or bevelled flange or side 176 integral with a stem portion 177 keyed to the shaft 173 as at 178. Disposed about said stem portion 177 and keyed thereon at 177a is a sleeve-like portion 179 of a second slightly cone-shaped or bevelled pulley part or flange 180.

Located about the sleeve-like part 179 is a larger diameter sleeve-like part 181 having a bottom or lower flange 182 resting on the pulley part 180 and over the described parts is a hood or container-like member 183 through the outer end wall of which passes a bolt 184 threaded into the stem-like portion 177 described as rigid with or integral with the pulley flange 176. A coil spring 185 is located between the outer end wall of the enclosure 183 and the flange-like portion 182 of the sleeve 181 and bears against each of them. Since the bolt 184 ties the enclosure member 183 to the pulley flange 176, it will be clear that the spring 185 is constantly urging the pulley flange 180 toward the pulley flange 176.

Figure 4:
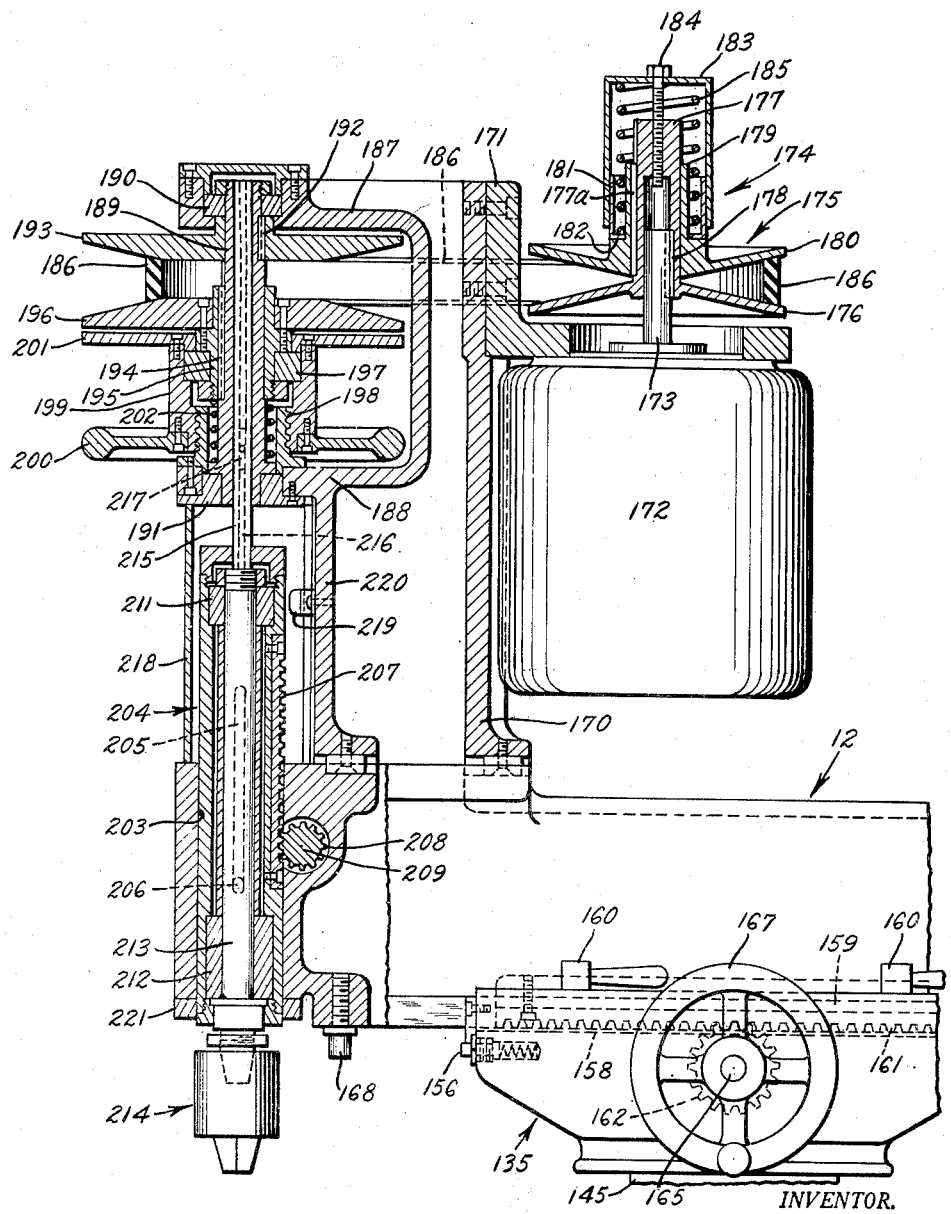
Fig. 4 is an enlarged sectional view taken as along the line 4—4 of Fig. 2.

A belt 186 operates from or is driven by the pulley 175 and it will be clear that as said belt is pulled more or less between the pulley flanges 176 and 180, reducing the effective diameter of said pulley, the pulley flange 180 will be forced away from the pulley flange 176 or upwardly as the parts are viewed in Fig. 4. This will be against the tendency of the spring 185 and will result in some compression of that spring. Alternatively, as the belt 186 is loosened, the spring 185 will urge the pulley flange 180 toward the pulley flange 176 with an action to crowd the belt 186 outwardly between said flanges and thereby increase the effective diameter of said pulley. Adjustment of the bolt 184 determines the stiffness of the spring 185 or the resistance of said spring to movement of the pulley flange 180 away from the pulley flange 176.

The casting 170 includes spaced upper and lower arm portions 187 and 188, respectively, and between such arm portions and adapted for rotation therein is a sleeve 189. Bearing means 190 receives the upper end of the sleeve while bearing means 191 receives and supports the lower end of the sleeve. A key 192 secures an upper bevelled pulley flange 193 to the sleeve 189 whereby these parts will turn as a unit.

About a lower portion of said sleeve 189 but keyed thereto as at 194 is a sleeve-like member 195 to which is bolted or otherwise secured a lower bevelled pulley flange 196, the flange 196 being a complement of flange 193. Sleeve 195 is mounted in a bearing 197. From Fig. 4, it will be clear that the sleeve 195 and pulley flange 196 will rotate with the sleeve 189 due to the key connection at 194 and since such connection is elongated, the mentioned parts may move longitudinally of said sleeve 189.

About the lower portion of the sleeve 189, but independent thereof and fixed to the casting arm 188, is an externally threaded member 198. Threaded on such member 198 is a hub-like portion 199 of a hand wheel 200. Secured on the upper end of said hub-like portion 199 is a plate or disc 201. With this construction it will be clear that on turning of the hand wheel 200 in one direction, the hub portion 199 and the plate 201 will be turned in that direction and the whole assembly will be threaded upwardly on the member 198. As such assembly is threaded upwardly, the pulley flange 196 will be moved toward the pulley flange 193 and the belt 186 will be crowded outwardly whereby the effective diameter of the pulley represented by the flanges 193 and 196 will be increased. Alternatively, on manual turning of the hand wheel 200 in the opposite direction, the hub-like portion would be threaded downwardly on the member 198 permitting the pulley flange 196 and its mounting 195 to move downwardly on the tubular drive shaft or sleeve 189.

Interposed between the parts is a heavy coil spring 202 serving to take up any back lash or play whereby the parts are all firm or rather rigid with respect to one another. In the forward end of the beam 12, in vertical alignment with the above described sleeve or hollow drive shaft 189, is an opening 203 mounting a quill device 204 for vertical movement. This quill device is provided with a longitudinally extending slot 205 into which extends a key 206 rigid with the forward portion of the beam 12 whereby the quill is adapted for longitudinal movement only and is held against any turning movement about its own axis.

Fixed to one side of the quill 204 is a rack bar 207 meshing with the teeth of a pinion 208, the shaft 209 of which extends to the side of the beam 12 and mounts a hand wheel 210. With the described construction it will be seen that on turning of the hand wheel 210, the quill 204 may be raised or lowered. Mounted in suitable upper and lower bearings 211 and 212 in the quill 204 is a drive shaft 213 shown as provided at its lower end, where it extends below the quill, with a chuck or any other suitable or desired form of tool holder or mounting means 214.

The shaft 213 has connected to it and in driving relation with it and in axial alignment with it an extension or a separate shaft 215 provided with a very long key way 216. Such key way receives a key 217 rigid with the sleeve or hollow drive shaft 189 above described. With this construction it will be clear that when the pulley comprising the flanges 193 and 196 is being driven by the belt 186, such pulley will drive the sleeve or hollow shaft 189 and the latter through the key 217 located in the key way 216 of the shaft 215 will drive such shaft.

The shaft 215 being part of or at least rigid with the shaft 213, the latter and the tool mounting means 214 will be rotated. The described drive remains effective in the various positions of the quill 204. That is, when the hand wheel 210 is operated to feed such quill and thus the tool holder 214 downwardly, the shaft 215 moves downwardly with these parts and because of its long key way 216 remains keyed to the hollow drive shaft 189 by the key 217.

Thus, the chuck or tool holder 214 may be raised and lowered by operation of the hand wheel 210 and means are provided for driving such chuck or tool holder in any of its vertical positions. The space between the portion 188 of the casting 170 and the upper side of the beam 12 may be closed as by means of a metal piece 218 which may be yieldingly held in place by being engaged by a spring clamp 219 secured to a wall portion 220 of said casting. This wall portion will also serve to close in the rear portion of the quill structure.

Movable with the quill 204 is a bracket piece 221 including a laterally extending lug 222 (Fig. 2) mounting a vertically disposed screw 223. Adjustable along such screw is a nut 224 and said screw passes freely through a lug 225 rigid with the forward portion of the beam 12. With this construction it will be seen that downward movement of the quill through operation of the hand wheel 210 will be limited by the position of the nut 224 on the screw 223. When this nut strikes the upper side of the rigid lug 225, further downward movement of the quill is prevented. In the reverse direction of movement of the quill, when the bracket-like piece 221 comes against the underside of the forward portion of the beam 12, an effective stop is provided preventing further upward movement of the quill.

With the machine as thus far described, assuming that a die set has been mounted and separated by upward movement of the platen 23 and that the platen has been turned through the desired arc, the underside of the punch holder will be exposed to the upper side of the platen. The punch holder may be laid out and then the beam 12 is adjusted to bring the tool holder 214 over the desired part of the punch holder. Then, the means including the beam and the parts mounted on the forward end thereof are used as a radial drill, suitable drills being mounted in the tool holder 214 as needed. The desired holes are drilled in the punch holder at the desired places. In this connection, it will be understood that as the parts are positioned, the hand wheel 210 is operated to bring the tools down to the work and then it is reversed and the motor 172 may be reversed to carry the tools out of the work. Generally speaking, reversal of the motor will not be necessary in these drilling operations.

The tool held by the chuck 214 at any time may be driven at any of an infinite number of speeds simply by adjusting the hand wheel 200 to change the diameter of the pulley represented by the pulley flanges 193 and 196. As the belt 186 is crowded outwardly between the flanges 193 and 196, the belt will be pulled in between the flanges of the pulley 175 so that a lesser diameter for that pulley will be used to drive a greater diameter for the pulley represented by the flanges 193 and 196 and the tool will be more slowly driven. As the wheel 200 is operated to permit the flanges 193 and 196 to move apart or to move the flange 196 away from the flange 193, the belt 186 will creep in between said flanges and will be forced outwardly with respect to the flanges of the pulley 175 by this action of the spring 185. Then a larger effective diameter of the pulley 175 will be acting on the belt which will be acting on a smaller effective diameter of the pulley represented by the flanges 193 and 196 and the tool will be more rapidly rotated.

After any desired drilling has been completed, different taps may at different times be mounted by the holder 214 for tapping work on the punch holder. At this time, the motor 172 will be switched into its lowest speed and then the pulley flange 196 will be adjusted so as to have a tool holder 214 driven at a low speed. While the radial drill construction herein disclosed is particularly designed for use on die sets which have been separated as herein disclosed, it will be appreciated that the radial drill feature may have some general utility. When adjustment of the beam 12 is made in directions longitudinally of the beam, the latter is preferably clamped tight by the clamp device 160 operating on the bar 159. Also, in any given case, it is preferable to set the nut 224 on the screw 223 to prevent excessive downward movement of the quill 204 and the tool held by the quill mounted work holder 214. It is of assistance in this connection to have the screw 223 marked by suitable graduations.

When using the machine of the invention occasionally it is necessary, or at least desirable, to remove part of the die set from the front of the machine. For this purpose, the machine includes means on the rear portion of the beam 12, which means may be secured to a member of the die set and then actuated to lift said member from the platen or the bed of the machine. Then the beam 12 is rotated on the pivotal axis provided by the post 141 to carry the member of the die set to the rear of the machine where it may be deposited on a convenient shelf or table, dolly or the like. Then when the work is completed on the part of the die set remaining at the front of the machine, the part which was previously removed is again attached to the lifting means in the same manner as previously and the beam 12 is turned on its pivot post 141 and the entire part brought back to the front of the machine at the desired exact location, lowered, and then the lifting means disconnected from it.

For swinging of the beam on the pivot represented by the post 141, a handle 226 is shown as rigidly attached to the rear of the beam. A relatively long quill 227 (see Figs. 1, 10 and 11) is mounted for sliding movement through an opening 228 in an enlarged head-like portion 229 at the rear of the beam 12. Along one side, the quill 227 is provided with rack teeth 230 meshing with a pinion 231 mounted on a shaft 232 extending transversely through the head 229. On one end of the shaft 232 is mounted a hand wheel 233 while on the other end of said shaft there is secured a ratchet wheel 234. The ratchet wheel is shown as located in a housing structure 235 and a pawl 236 pivoted at 237 constantly engages the ratchet wheel to hold it against accidental or casual reverse movement.

With this construction it will be clear that on turning of the hand wheel 233 in a direction to have the pinion 231 feed the quill 227 upwardly due to engagement between the teeth of said pinion and the teeth of the rack 230, the pawl 236 merely slips over the teeth of the ratchet wheel. However, on release of the handle, downward movement of the quill is prevented since the pawl locks with the next adjacent tooth of the ratchet wheel. To prevent any turning of the quill about its own axis, the same is provided with a groove or way 238 in which enters a lug-like key 239.

Within the quill 227 and turnable therein about its own axis is a bar or rod 240. This bar or rod is shown as mounted in upper and lower bushings 241 and 242 and the lower end of the bar or rod is shown as threaded at 243. A hand wheel 244 is fixed to the upper end of the bar or rod 240. With this construction it will be clear that as the quill is moved up or down the bar or rod 240 is similarly moved but that such bar or rod may be turned about its own axis in the quill or relative to the quill through manipulation of the hand wheel 244.

With the described construction, as the piece is to be lifted and moved from the front of the machine to an out-of-the-way position, the piece may have a hole tapped therein and into which the threaded end portion 243 of the bar or rod 240 may be threaded. Of course, any suitable adaptor into which this portion of the rod may be threaded may be fixed to the die part or other piece to be moved. Then, using the handle 226 or otherwise, the clamp 151 being loosened, the beam 12 is swung with the pivot post 141 to dispose the quill over the work piece to be handled.

Longitudinal adjustment of the beam 12 relative to the head 135, if necessary, is made on loosening of the clamps 160 and then turning of one of the hand wheels 166 or 167. The quill being located above the work, the quill is fed downwardly by the operator withholding the pawl 236 from the ratchet 234 the desired or proper amount and then the hand wheel 244 is operated to thread the lower end portion 243 of the bar or rod 240 into the tapped opening provided in the work or in an adaptor secured to the work. Then the hand wheel 233 is operated to raise the quill and the work attached to the rod or bar 240 until the work or die member or the like is clear of all other parts of the machine. Then beam 12 is swung on the pivot represented by the post 141 to carry the entire part or member or other work away from the front of the machine.

At the rear of the machine, there may be a shelf, table or the like, and the pawl 236 is held free of the ratchet 234 while the hand wheel 233 is used to lower the quill to deposit the work on such shelf, or table. When that is accomplished, hand wheel 244 is operated to turn the bar or rod 240 in a reverse direction to thread the same out of the tapped opening in or secured to the work piece. Such work piece may be carried away from the machine or may be left on a shelf forming part of the machine, as desired.

Then operations proceed at the front of the machine as planned or scheduled and when such operations are completed, the removed work piece is brought back (if it has been removed) to the rear of the machine and the quill is lowered, if necessary, and the bar or rod 240 threaded to the work piece. Then the hand wheel 233 is used to raise the quill and the work piece and thereafter the beam 12 is again swung on the pivot represented by the post 141 to carry the work piece back to the front of the machine. There, any desired or proper aligning is done and the pawl 236 held away from the ratchet 234 while the hand wheel 233 is used to lower the quill and thus to lower the work piece back into the exact desired position.

Having thus set forth the nature of my invention, what I claim is:

1. In a machine for assembling and trying out dies, a base supporting a horizontal bed, a vertical post at each of a pair of opposite sides of said base, means mounting said posts for vertical movements on said base, a platen over said bed and at one side having a face against which a punch holder is to be secured, means extending from said side of said platen and rigid with the latter, pivot means cooperating with said means and mounting said platen on said posts for vertical movements with the latter and for turning movements relative thereto on an axis represented by the center of said pivot means, means for moving said platen about said center as an axis, means for moving said posts in unison to move said platen from and toward said bed, said means extending from said side of the platen having spaced recesses therein all concentric with said axis, and a key mounted on one of said posts for selective movement into and out of said recesses for locking said platen in various positions of adjustment about said horizontal axis.

2. In a machine for assembling and trying out dies, a base having a bed at its upper side adapted to have a member of a die set disposed thereon, a beam, means mounting said beam for turning movement about a vertical axis located at the rear side of said base and for longitudinal movement over said base toward and from the front side of said base, a quill mounted for vertical movement on one end of said beam, a bar rotatable in said quill and movable vertically therewith and extending through the same, said bar externally threaded at its lower end for threaded connection with a die set member on said bed, means secured to the upper end of said bar for rotating the same in said quill and means for moving said quill vertically after said bar has been connected with a member of a die set whereby to raise the latter from said bed, and said beam thereafter shiftable on said axis to carry said member away from said bed.

3. In a machine for assembling and trying out dies, a base having a bed at its upper side adapted to have a member of a die set disposed thereon, a beam, means mounting said beam for turning movement about a vertical axis located at the rear side of said base and for longitudinal movement over said base toward and from the front side of said base, a quill mounted for vertical movement on one end of said beam, a bar rotatable in said quill and movable vertically therewith and extending through the same, said bar externally threaded at its lower end for threaded connection with a die set member on said bed, means secured to the upper end of said bar for rotating the same in said quill, and rack and gear means for moving said quill vertically after said bar has been connected with a member of a die set whereby to raise the latter from said bed and said beam thereafter shiftable on said axis to carry said member away from said bed.

4. In a machine for assembling and trying out dies, a base having a bed at its upper side adapted to have a member of a die set disposed thereon, a beam, means mounting said beam for turning movement about a vertical axis located at the rear side of said base and for longitudinal movement over said base toward and from the front side of said base, a quill mounted for vertical movement on one end of said beam, a bar rotable in said quill and movable vertically therewith and extending downwardly through the same, said bar threaded at its lower end for threaded connection with a die set member on said bed, means secured to the upper end of said bar for rotating the same in said quill, rack and gear means for moving said quill vertically after said bar has been connected with a member of a die set whereby to raise the latter from said bed and said beam thereafter shiftable on said axis to carry said member away from said bed, and pawl and ratchet means associated with said rack and gear means and operable to prevent casual downward movement of said quill.

5. In a machine for assembling and trying out dies, a beam, means mounting said beam for turning movement about a vertical axis and for longitudinal movement at right angles to said axis, a horizontal bed below said beam and adapted to have a die set disposed thereon, a quill mounted for vertical movement on the forward end portion of said beam, a tool holder at the underside of said beam and movable with said quill, means for moving said quill vertically relative to said beam, a shaft extending through said quill and connected with said tool holder, means on said beam to drive said shaft and thus said tool holder, a quill mounted for vertical movement on the rearward end portion of said beam, a bar rotatable about a vertical axis in said quill and movable vertically with the quill and extending downwardly through the same and at its lower end adapted to be connected to the upper member of a die set on said bed, means for moving said quill vertically after the bar has been connected with said upper die set member whereby to raise the latter from the lower member of the die set on said bed, and said beam thereafter shiftable on said vertical axis to carry said member away from said bed and to bring the tool holder mounting end of the beam over said bed for the lowering of said tool holder to bring a tool against a die member on the bed.

6. In combination in a machine for assembling and trying out dies, a horizontal bed for a die set including first and second members, means above said bed for raising the first member off the second member and for then rotating the said first member through substantially 180 degrees to invert it and face its former lower side upwardly, a support extending above the uppermost position to which the first mentioned means may position said first member, a tool holder and a drive therefor adjustably mounted on said support and adjustable thereon to position a tool held by said holder for work on any selected portion of the upper side of said inverted first member, means to lower and raise said tool holder on said support to bring a tool against and move the tool from the upwardly facing side of said inverted member, said first mentioned means then invertible to return said first member to position over the second member of the set, and to then lower said first member in its initial position on said second member.

7. In combination in a machine for assembling and trying out dies, a horizontal support for a die set including first and second members, means above said support for raising the first member off the second member and for then rotating the said first member through substantially 180 degrees to invert it and face its former lower side upwardly, a tool holder, means movably mounting said tool holder for adjustment to a position over any selected portion of the upwardly facing side of said inverted first member to position a tool carried by said tool holder over such selected portion of the upwardly facing side of said inverted first member, means for driving said tool holder, means for lowering and raising said tool holder in a straight line movement to carry a tool mounted thereby to and from such selected portion of the upwardly facing side of said inverted first member, said first mentioned means then invertible to return said first member to position over the second member, and to then lower said first member in its initial position on said second member.

8. In a machine for assembling and trying out dies, a base, a horizontal support on said base and adapted to have the second member of a die set including superimposed first and second members disposed thereon and to have the second of said members secured thereagainst, a platen above said support and adapted to have the first of said members secured to its underside while said members are superimposed and disposed on said support with said first member uppermost, means for raising said platen with respect to said support to separate said die members, said platen mounted for rotation about a horizontal axis, means for rotating said platen about said axis through 180 degrees to invert said first member and support it in inverted position, a tool holder, means movably mounting said tool holder for adjustment to a position over any selected portion of the upwardly facing side of said inverted first member to position a tool carried by said tool holder over such selected portion of the upwardly facing side of said inverted first member, means for driving said tool holder, means for lowering and raising said tool holder in a straight line movement to carry a tool mounted thereby to and from such selected portion of the upwardly facing side of said inverted member, said first mentioned means then invertible to return said platen and first member to position over the second member, and said second mentioned means invertible to then lower said platen to replace said first member in its initial position on said second member.

9. In a machine for assembling and trying out dies, a base supporting a horizontal bed adapted to have the second member of an assembled die set comprising first and second members disposed thereon, vertical posts at each of a pair of opposite sides of said base, means mounting said posts for vertical movements relative to said base, a platen over said base and adapted to have the first member of such assembled die set secured to its underside, means mounting said platen on said post for vertical movement therewith and for turning movement relative thereto about a horizontal axis to lift the first member off the second member of the assembled die set and to then turn said first member through approximately 180 degrees to an invertible position with its formerly underside now comprising its upper side, a first means for moving said posts in unison to move said platen from said bed and raise said first member from the second member, other means for turning said platen about said horizontal axis to invert said first member when the platen has been moved a predetermined distance from said horizontal bed, a tool holder, means movably mounting said tool holder for adjustment to a position over any selected portion of the then upwardly facing side of said first member to position a tool carried by said tool holder in line for performance of work on such selected portion of the upwardly facing side of said first member, means for driving said tool holder, means for causing relative straight line vertical movement between said tool holder and inverted first member to cause working engagement between a tool carried by said tool holder and work on such selected portion of the upwardly facing side of said inverted first member and to separate such a tool and said member, said other means then operable to invert said platen to position said first member over the second member with their assembled opposing sides in opposing relation, and said first means then operable to lower said platen to lower said first member into its initial position on said second member of the die set.

10. In a machine for assembling and trying out die sets, a horizontal bed, a horizontal platen over said bed, said bed adapted to have an assembled die set disposed thereon with one member of the die set secured thereto, said platen adapted to have the other member of said die set secured thereto, means mounting said platen for movement from and toward said horizontal bed and when moved from said horizontal bed for turning movement through approximately 180 degrees to an inverted position, power means for moving said platen away from said bed and to thus separate the members of said die set by drawing the said other thereof from the said one thereof, other means for turning said platen about said horizontal axis to dispose said other member in position invert to that formerly occupied by it, a tool holder, means movably mounting said tool holder for adjustment to a position over any selected portion of the upwardly facing side of said inverted member to position a tool carried by said tool holder in line for performance of work on such selected portion of the upwardly facing side of said member, means for driving said tool, means for causing relative straight line vertical movement between said tool holder and inverted first member to cause working engagement between a tool carried by said tool holder and work on such selected portion of the upwardly facing side of said inverted first member and to separate such a tool and said member, said other means then operable to invert said platen to position said other member over said one member of said die set, and said power means then operable to lower said platen to lower said other member into its initial position on said one member.

11. In a machine for assembling and trying out die sets, a base supporting a horizontal bed adapted to have an assembled die set disposed thereon, a vertical post at each of a pair of opposite sides of said base, means mounting said post for vertical movements on said base, a platen over said bed and adapted to have the punch holder of such die set secured thereto, means mounting said platen on said post for vertical movement therewith to move the punch holder of such a die set from the bed thereof and for turning movement relative to said base about a horizontal axis to invert the position of such a punch holder and face its tool mounting surface upwardly, means for moving said posts in unison to move said platen from and toward said bed to carry a punch holder which is secured to the platen from and toward the bed of a die set on said horizontal bed, means for turning said platen about said horizontal axis when said platen has been moved and has moved a punch holder upwardly from a die set bed on said horizontal bed, a beam, means mounting said beam in a position above the highest position to which a punch holder may be moved and inverted by said platen, a quill mounted for vertical movement on the forward end portion of said beam, a tool holder movable with said quill, a shaft extending through said quill and connected with said tool holder, an electric motor on said beam, a belt and pulley drive between said motor and said shaft whereby said motor may drive said tool holder, said belt and pulley drive including adjustable pulleys whereby the speed at which said motor drives said shaft may be varied, means mounting said beam for turning movement about a vertical axis located at the rear side of said base and for a longitudinal movement toward and from the front side of said base whereby to dispose said quill and tool holder over the selected portion of the upwardly facing tool mounting surface of a punch holder being held in reverse position by said platen, means for moving said quill vertically downwardly relative to said beam to engage a tool held by said tool holder with the selected portion of said surface, and for then moving said quill upwardly to carry such tool from said punch holder, said means for turning said platen about a horizontal axis then operable to invert the platen and place the punch holder in position with its originally lower side in opposing relation with the upper side of the bed of the die set, and said means for moving said posts in unison then operable to lower said posts and platen to lower the punch holder into its initial position on the die set bed.

12. In a machine for assembling and trying out die sets, a base supporting a horizontal bed adapted to have an assembled die set disposed thereon, a vertical post at each of a pair of opposite sides of said base, means mounting said post for vertical movements on said base, a platen over said bed and adapted to have the punch holder of such die set secured thereto, means mounting said platen on said post for vertical movement therewith to move the punch holder of such a die set from the the bed thereof and for turning movement relative to said base about a horizontal axis to invert the position of such a punch holder and face its tool mounting surface upwardly, means for moving said posts in unison to move said platen from and toward said bed to carry a punch holder which is secured to the platen from and toward the bed of a die set on said horizontal bed, means for turning said platen about said horizontal axis when said platen has been moved and has moved a punch holder upwardly from a die set bed on said horizontal bed, a beam, means mounting said beam in a position above the highest position to which a punch holder may be moved and reversed by said platen, a quill mounted for vertical movement on the forward end portion of said beam, a tool holder movable with said quill, a shaft extending through said quill and connected with said tool holder, an electric motor on said beam and connected to drive said shaft, means mounting said beam for turning movement about a vertical axis located at the rear side of said base and for a longitudinal movement toward and from the front side of said base whereby to dispose said quill and tool holder over the selected portion of the upwardly facing tool mounting surface of a punch holder being held in inverted position by said platen, means for moving said quill vertically downwardly relative to said beam to engage a tool held by said tool holder with the selected portion of said surface and for then moving said quill upwardly to carry such tool from said punch holder, said means for turning said platen about a horizontal axis then operable to reverse the platen and place the punch holder in position with its originally lower side in opposing relation with the upper side of the bed of the die set, and said means for moving said posts in unison then operable to lower said posts and platen to lower the punch holder into its initial position on the die set bed.

13. In combination in a machine for assembling and trying out dies, means to support an assembled die set including a bed and a punch holder, means above the first mentioned means for raising the punch holder up off the bed of the die set and for then rotating said punch holder through substantially 180 degrees to face its tool mounting side upwardly, a beam, a quill mounted for vertical movement on the forward end portion of said beam, a tool holder movable with said quill, a shaft extending through said quill and connected with said tool holder, an electric motor on said beam, a belt and pulley drive between said motor and said shaft whereby said motor may drive said tool holder, a pair of pulleys of said belt and pulley drive each including bevelled flanged portions of which one bevelled flange of each pulley is adjustable toward and from the other bevelled flange of said pulley to change the drive ratio between the pulleys and thus between said motor and said shaft, manual means for adjusting the adjustable flange of one pulley toward and from the other flange of said pulley, spring means acting against the movable flange of the other pulley and providing for automatic adjustment of the latter to compensate for adjustment through said manual means, means mounting said beam above said platen for turning movement about a vertical axis located at the rear side of said base and for longitudinal movement in a plane above said platen toward and from the front side of said base whereby to dispose said quill and tool holder over the selected portion of the upwardly facing tool mounting side of a punch holder held in inverted position by said platen, means for moving said quill vertically relative to said beam to carry said tool holder and thus a tool mounted by the latter toward and from said selected portion of the upwardly facing surface of a punch holder being held in inverted position by said platen, and said means above said first mentioned means then operable to invert said punch holder back to its original position and to lower it into its initial position on the bed of said die set.

14. In a machine for assembling and trying out dies comprising first and second members, said machine including a horizontal support, a platen having a work engaging face against which work is to be clamped, means mounting said platen for rotation about a horizontal axis located above said support, a first means for rotating said platen to position its work engaging face for clamping to a side of the first member of a die set the members of which are arranged in side-by-side relation on said support, a second means operable to then elevate said platen and raise said die set off said support, said first means then again operable to rotate said platen to a position with its work engaging face facing upwardly with said die set on the upper side of the platen and the second member of the die set superimposed on the first thereof, a third means then operable to lift the second member off the first member and swing said second member laterally, means supporting a tool holder above the highest position to which said platen may move a die set, said means then adjustable to dispose said tool holder over the selected portion of the upper side of the first member, means to then move said tool holder vertically downwardly to engage a tool held thereby with the selected portion of said first member and to then move the tool holder vertically upwardly to withdraw the tool from said first member, said third means then operable to swing said second member laterally back to a position over said first member and lower it to its initial position thereon, said first means then operable to rotate said platen to a position with the reassembled die set suspended therefrom, and said second means then operable to lower said platen to place said die set on said horizontal support.

15. In a machine for assembling and trying out dies, a base, a platen, means supporting said platen over said base for movement from and toward the same and for turning movement about a horizontal axis from a downwardly facing position to selected positions facing horizontally in opposite directions and upwardly, said platen when facing downwardly adapted to be secured to the upper member of a die set the members of which are superimposed and disposed on said support and when facing upwardly to have one member of a die set the members of which are superimposed disposed thereon and when facing horizontally in either direction to be secured to the adjacent member of a die set the members of which are arranged in side-by-side relation on said support, said platen from each of said first and second mentioned positions adapted to be rotated to face upwardly with the superimposed die set members on its upward side, a vertical post at the rear of said base and extending above the same, a beam on said post and extending horizontally therefrom, a tool holder mounted on said beam toward one end thereof, a lifting device mounted on said beam toward the other end thereof and vertically adjustable thereon, said beam rotatable on said post in a horizontal plane about a vertical axis whereby to dispose the second mentioned end portion of the beam over the upper side of the second one of the superimposed die members supported on the upper side of said upwardly facing platen, said lifting device then vertically adjustable downwardly toward said second die member and adapted to be secured thereto and then vertically adjustable upwardly therefrom to lift the second die member off the first die member of said superimposed die members, said beam then rotatable through approximately 180 degrees on said vertical axis to carry said second die member to the one side of said base and to carry said tool holder over the lower of said die members, means mounting said beam for longitudinal adjustment whereby with such pivotal adjustment the beam may be positioned to dispose said tool holder over the selected portion of the upper side of said lower die member, means on said beam to drive said tool holder, means for adjusting said tool holder downwardly to engage a tool carried thereby with the selected portion of the upper side of said lower die member and to then adjust said tool holder upwardly to withdraw said tool, said beam then adapted to be swung back through said approximately 180 degrees to dispose said upper die member over the lower die member, said lifting device then operable to lower said upper die member into its initial position on said lower die member, and said platen then adapted to have the assembled die members lifted therefrom and also adapted to be rotated on said horizontal axis through approximately 180 degrees and then adjusted downwardly to lower said die set members onto said horizontal support in superimposed relation and with the formerly upper die set member lowermost.

16. In a machine for assembling and trying out die sets, a base, a platen supported from and located above said base and including a horizontal support adapted to have an assembled die set comprising superimposed members disposed thereon with the lowermost thereof secured thereto, a vertical post at one side of said base, a beam on said post and rotatable about a vertical axis, a lifting device on one end portion of said beam and vertically adjustable relative thereto, a tool holder on the other end portion of said beam and vertically adjustable relative thereto, said beam rotatable about said vertical axis in a fixed horizontal plane to dispose said lifting device over the upper member of a die set on said platen, said lifting device vertically adjustable on said beam for attachment to the upper member of the die set and then vertically adjustable in the opposite direction to lift the upper die set member from the lower die set member, said beam then rotatable on said vertical axis to carry said upper die set member from over the lower die set member and to bring said tool holder over the lower die set member, means mounting said beam on said post for longitudinal adjustment in addition to rotational movement about said vertical axis whereby to dispose said tool holder over the selected portion of said lower die set member, means for moving said tool holder downwardly relative to said beam for engaging a tool carried by said holder with the selected portion of said lower die set member and for then raising the tool holder to raise the tool from said lower die set member, said beam then adapted for rotation in said horizontal plane to return said upper die set member to a position over the lower die set member, said lifter device then vertically adjustable downwardly to lower said upper die set member into its initial position on the lower die set member and then vertically adjustable upwardly to an out of the way position.

17. In a machine for assembling and trying out die sets, a base, a platen supported from and located above said base and including a horizontal support adapted to have an assembled die set comprising superimposed members disposed thereon with the lowermost thereof secured thereto, a vertical post at one side of said base, a beam on said post and rotatable about a vertical axis, a lifting device on one end portion of said beam and vertically adjustable relative thereto, a tool holder on the other end portion of said beam and vertically adjustable relative thereto, said beam rotatable about said vertical axis in a fixed horizontal plane to dispose said lifting device over the upper member of a die set on said platen, said lifting device vertically adjustable on said beam for attachment to the upper member of the die set and then vertically adjustable in the opposite direction to lift the upper die set member from the lower die set member, said beam then rotatable on said vertical axis to carry said upper die set member from over the lower die set member and to bring said tool holder over the lower die set member, means mounting said beam on said post for longitudinal adjustment in addition to rotational movement about said vertical axis whereby to dispose said tool holder over the selected portion of said lower die set member, means for moving said tool holder downwardly relative to said beam for engaging a tool carried by said holder with the selected portion of said lower die set member and for then raising the tool holder to raise the tool from said lower die set member, said beam then adapted for rotation in said horizontal plane to return said upper die set member to a position over the lower die set member, said lifting device then vertically adjustable downwardly to lower said upper die set member into its initial position on the lower die set member and then vertically adjustable upwardly to an out of the way position, said platen vertically adjustable relative to said base, and means for vertically adjusting said platen at will to position said upper and lower die set member in the desired vertical relation to said beam and thus to said lifting device and tool holder, respectively.

18. In a machine for assembling and trying out die sets, a base, a horizontal support on said base, a platen supported from and located above said base and adapted to have an assembled die set comprising superimposed members disposed thereon with the lowermost thereof secured thereto, a vertical post at one side of said base, a beam on said post and rotatable about a vertical axis, a lifting device on one end portion of said beam and vertically adjustable relative thereto, a tool holder on the other end portion of said beam and vertically adjustable relative thereto, said beam rotatable about said vertical axis in a fixed horizontal plane to dispose said lifting device over the upper member of a die set on said platen, said lifting device vertically adjustable on said beam for attachment to the upper member of the die set and then vertically adjustable in the opposite direction to lift the upper die set member from the lower die set member, said beam then rotatable on said vertical axis to carry said upper die set member from over the lower die set member and to bring said tool holder over the lower die set member, means mounting said beam on said post for longitudinal adjustment in addition to rotational movement about said vertical axis whereby to dispose said tool holder over the selected portion of said lower die set member, means for moving said tool holder downwardly relative to said beam for engaging a tool carried by said holder with the selected portion of said lower die set member and for then raising the tool holder to raise the tool from said lower die set member, said beam then adapted for rotation in said horizontal plane to return said upper die set member to a position over the lower die set member, said lifting device then vertically adjustable downwardly to lower said upper die set member into its initial position on the lower die set member and then vertically adjustable upwardly to an out of the way position, said platen turnable on a horizontal axis to locate said die set at the underside of the platen, means for so rotating said platen, and other means for then adjusting said platen vertically downwardly to lower the die set onto said horizontal support.

19. In a machine for assembling and trying out die sets, a base, a horizontal support on said base, a platen supported from and located above said base and adapted to have an assembled die set comprising first and second superimposed members disposed thereon with the lowermost thereof secured thereto, a vertical post at one side of said base, a beam on said post and rotatable about a vertical axis, a lifting device on one end portion of said beam and vertically adjustable relative thereto, a tool holder on the other end portion of said beam and vertically adjustable relative thereto, said beam rotatable about said vertical axis in a fixed horizontal plane to dispose said lifting device over the upper member of a die set on said platen, said lifting device vertically adjustable on said beam for attachment to the upper member of the die set and then vertically adjustable in the opposite direction to lift the upper die set member from the lower die set member, said beam then rotatable on said vertical axis to carry said upper die set member from over the lower die set member and to bring said tool holder over the lower die set member, means mounting said beam on said post for longitudinal adjustment in addition to rotational movement about said vertical axis whereby to dispose said tool holder over the selected portion of said lower die set member, means for moving said tool holder downwardly relative to said beam for engaging a tool carried by said holder with the selected portion of said lower die set member and for then raising the tool holder to raise the tool from said lower die set member, said beam then adapted for rotation in said horizontal plane to return said upper die set member to a position over the lower die set member, said lifting device then vertically adjustable downwardly to lower said upper die set member into its initial position on the lower die set member and then vertically adjustable upwardly to an out of the way position, said platen vertically adjustable relative to said base, means for vertically adjusting said platen at will to position said upper and lower die set members in the desired vertical relation to said beam and thus to said lifting device and tool holder, respectively, means mounting said platen for turning movement about a horizontal axis located above said horizontal support to locate said die set at the underside of the platen, means for so rotating said platen, and said means for vertically adjusting the platen then operable to adjust the platen downwardly to lower the die set onto said horizontal support.

20. In combination in a machine for assembling and trying out dies, a support for an assembled die set including first and second members, a platen for raising the die set off said support and for rotating it to position it with its members in superimposed relation with its second member uppermost, a beam having two end portions, means mounting said beam intermediate said end portions in a plane above that of a die set being held with its second member uppermost by said platen and for turning movement about a vertical axis whereby one or the other of said end portions may be disposed over a die set so held by said platen, means mounting said beam for longitudinal adjustment for movement transversely of said vertical axis, lifter means mounted for vertical adjustment on one end portion of said beam and adapted when such end portion of the beam is over said platen to be adjusted downwardly and at its lower end secured to the second member of a die set so held on the platen and then adapted to be adjusted vertically upwardly to lift said second member off the first member of the platen supported die set, said beam then adapted for adjustment about said vertical axis to carry said second member from over the first member and to dispose the other end portion of the beam over the latter, a tool holder mounted on said other end portion of the beam and vertically adjustable relative thereto, means on said beam for rotating said tool holder, said tool holder adjustable to a position over the selected portion of the upper surface of the first member held by said platen, means for moving said tool holder downwardly with respect to said beam to bring a tool carried by the holder against said selected portion of the first member and to then raise the tool holder, said beam then rotatable about said vertical axis to bring the second member back over the first member on said platen, said lifter means then adjustable to lower said second member back to its initial position on said first member, and means for then moving said platen to rotate said die set back to the initial relation of its members with said support and to lower it onto said support.

21. In combination in a machine for assembling and trying out dies, a support for an assembled die set including first and second members, a platen for raising a die set off said support and for rotating it to position it with its members in superimposed relation with its second member uppermost, a beam having two end portions, means mounting said beam intermediate said end portions in a plane above that of a die set being held with its second member uppermost by said platen and for turning movement about a vertical axis whereby one or the other of said end portions may be disposed over a die set so held by said platen, means mounting said beam for longitudinal adjustment for movement transversely of said vertical axis, a lifter means mounted for vertical adjustment on one end portion of said beam and adapted when such end portion of the beam is over said platen to be adjusted downwardly and at its lower end secured to the second member of a die set so held on the platen and then adapted to be adjusted vertically upwardly to lift said second member off the first member of the platen supported die set, said beam then adapted for adjustment about said vertical axis to carry said second member from over the first member and to dispose the other end portion of the beam over the latter, a quill mounted for vertical movement on said other end portion of said beam, a tool holder movable with said quill, a shaft extending through said quill and connected with said tool holder, an electric motor on said beam, a belt and pulley drive between said motor and said shaft whereby said motor may drive said tool holder, a pair of pulleys of said belt and pulley drive each including bevelled flanges of which one bevelled flange of each pulley is adjustable toward and from the other bevelled flange of said pulley to change the drive ratio between the pulleys, manual means for adjusting the adjustable flange of one pulley toward and from the other flange of said pulley, spring means acting against the movable flange of the other pulley and providing for automatic adjustment of the latter to compensate for adjustments through said manual means, means for then moving said quill vertically downwardly to engage a tool held by said tool holder with said selected portion of said first member held by said platen to bring a tool carried by the holder against said selected portion of the platen held first member and to then move said quill upwardly to raise such a tool from the selected portion of said first member, said beam then rotatable about said vertical axis to bring the second member of the die set back over the first member on said platen, said lifter means then adapted to lower said second member back to its initial position on the first member of the die set, and means for then moving said platen to rotate said die set back to the initial relation of its members to said support and to then lower the die set onto said support.

22. In combination in a machine for assembling and trying out dies, a support for an assembled die set including first and second members, a platen for raising the die set off said support and for rotating it to position it with its members in superimposed relation with its second member uppermost, a beam having two end portions, means mounting said beam intermediate said end portions in a plane above that of a die set being held with its second member uppermost by said platen and for turning movement about a vertical axis whereby one or the other of said end portions may be disposed over a die set so held by said platen, means mounting said beam for longitudinal adjustment for movement transversely of said vertical axis, a quill mounted for vertical movement on one end portion of said beam, a bar rotatable about a vertical axis in said quill and movable vertically therethrough and extending downwardly through the lower end thereof, said quill adapted when said end portion of the beam is disposed over said platen to be adjusted downwardly with said bar to bring the lower end of said bar adjacent the second member of a die set being held on the platen, said lower end of said bar adapted then to be secured to said second member, said means for moving said quill then operable to move the same vertically upwardly whereby to raise the second member off the first member of the die set, said beam then adapted for adjustment about said vertical axis to carry said second member from over the first member of a die set and to dispose the other end portion of the beam over the latter, a tool holder mounted on said other end portion of the beam and vertically adjustable relative thereto, means on said beam for rotating said tool holder, means for moving said tool holder downwardly with respect to said beam to bring a tool carried by the holder against said selected portion of the second member of the die set and to then raise the tool holder, said beam then rotatable about said vertical axis to bring the second member back over the first member on the platen, said means then operable to adjust said quill vertically downwardly with said bar to lower said second member back to its initial position on said first member, and means for then moving said platen to rotate said die set back to the initial relation of its members with said support and to lower it onto said support.

23. In combination in a machine for assembling and trying out dies, a support for an assembled die set including first and second members, a platen for raising a die set off said support and for rotating it to position it with its members in superimposed relation with its second member uppermost, a beam having two end portions, means mounting said beam intermediate said end portions in a plane above that of a die set being held with its second member uppermost by said platen and for turning movement about a vertical axis whereby one or the other of said end portions may be disposed over a die set so held by said platen, means mounting said beam for longitudinal adjustment for movement transversely of said vertical axis, a quill mounted for vertical movement on one end portion of said beam, a bar rotatable about a vertical axis in said quill and movable vertically therewith and extending downwardly through the lower end thereof, means for adjusting said quill downwardly when said beam is positioned with its said end portion over said platen to bring the lower end of said bar adjacent the second member of a die set being held by the platen, means for then connecting the lower end of said bar with said second member, said means for moving said quill vertically downwardly then operable to move the same vertically upwardly to raise said bar and thereby raise the second member of the die set from the first member thereof, said beam then adapted for adjustment about said vertical axis to carry said second member from over the first member of a die set and to dispose the other end portion of said beam over the latter, a quill mounted for vertical movement on said other end portion of said beam, a tool holder movable with the second mentioned quill, a shaft extending through said second mentioned quill and connected with said tool holder, an electric motor on said beam, a belt and pulley drive between said motor and said shaft whereby said motor may drive said tool holder, a pair of pulleys of said belt and pulley drive each including bevelled flanges of which one bevelled flange of each pulley is adjustable toward and from the other bevelled flange of said pulley to change the drive ratio between the pulleys, manual means for adjusting the adjustable flange of one pulley toward and from the other flange of said pulley, spring means acting against the movable flange of the other pulley and providing for automatic adjustment of the latter to compensate for adjustments through said manual means, means for moving said second mentioned quill downwardly with respect to said beam to move said tool holder downwardly and bring a tool carried by the latter against said selected portion of the first member of the die set and to then raise said second mentioned quill and thereby said tool holder, said beam then rotatable about said vertical axis to bring the second member of the die set back over the first member on said platen, said means for adjusting the first mentioned quill then operable to adjust the latter and said shaft downwardly to lower said second member of the die set back to its initial position on the platen supported first member of the die set, and means for then moving said platen to rotate said die set back to the initial relation of its members with said support and to lower it onto said support.

24. In combination in a machine for assembling and trying out dies, a support for an assembled die set including first and second members, a platen for raising a die set off said support and for rotating it to position it with its members in superimposed relation with its second member uppermost, a beam having two end portions, means mounting said beam intermediate said end portions in a plane above that of a die set being held with its second member uppermost by said platen and for turning movement about a vertical axis whereby one or the other of said end portions may be disposed over a die set so held by said platen, means mounting said beam for longitudinal adjustment for movement transversely of said vertcial axis, a quill mounted for vertical movement on one end portion of said beam, a bar rotatable about a vertical axis in said quill and movable vertically therewith and extending downwardly through the lower end thereof, means for adjusting said quill downwardly when said beam is positioned with its said end portion over said platen to bring the lower end of said bar adjacent the second member of a die set being held by the platen, means for then connecting the lower end of said bar with said second member, said means for moving said quill vertically comprising a rack and gear means, a pawl and ratchet means associated with said rack and gear means and operable to prevent casual downward movement of said quill, said means for moving said quill vertically downwardly then operable to move the same vertically upwardly to raise said bar and thereby raise the second member of the die set from the first member thereof, said beam then adapted for adjustment about said vertical axis to carry said raised second member from over the first member of a die set and to dispose the other end portion of said beam over the latter, a quill mounted for vertical movement on said other end portion of said beam, a tool holder movable with the second mentioned quill, a shaft extending through said second mentioned quill and connected with said tool holder, an electric motor on said beam, a belt and pulley drive between said motor and said shaft whereby said motor may drive said tool holder, a pair of pulleys of said belt and pulley drive each including bevelled flanges of which one bevelled flange of each pulley is adjustable toward and from the other bevelled flange of said pulley to change the drive ratio between the pulleys, manual means for adjusting the adjustable flange of one pulley toward and from the other flange of said pulley, spring means acting against the movable flange of the other pulley and providing for automatic adjustment of the latter to compensate for adjustments through said manual means, means for moving said second mentioned quill downwardly with respect to said beam to move said tool holder downwardly and bring a tool carried by the latter against said selected portion of the first member of the die set and to then raise said second mentioned quill and thereby said tool holder, said beam then rotatable about said vertical axis to bring the second member of the die set back over the first member on said platen, said means for adjusting the first mentioned quill then operable to adjust the latter and said shaft downwardly to lower said second member of the die set back to its initial position on the platen supported first member of the die set, and means for then moving said platen to rotate said die back to the initial relation of its members with said support and to lower it onto said support.

25. In combination in a machine for assembling and trying out dies, a horizontal die set support adapted to have a die set comprising respectively upper and lower first and second members disposed thereon, a manipulating support above said horizontal die set support, means mounting said manipulating support for vertical adjustment, means mounting said manipulating support for rotatable adjustment on a horizontal axis, said manipulating support adapted to have a member of said die set on said die set support fixedly connected thereto whereby to raise the die set from said die set support and rotate it to dispose it with its second member uppermost, a lifting means, means mounting said lifting means whereby it is vertically adjustable and horizontally swingable about a vertical axis adapted to raise said second member off the first member and to swing it to a position laterally of said first member, a tool holder, means mounting said tool holder for adjustments in a horizontal plane to a position over any selected portion of said first member being held by said manipulating support and for vertical movement toward and from such selected portion of said first member to bring a tool thereagainst and to remove a tool therefrom, said manipulating support being then operable to swing the second member back into position over and to lower it into its initial position on said first member, and said manipulating support being then turnable on its horizontal axis to position said die set with the second member thereof downwardmost and to then lower the reassembled die set onto said die set support with the second member of the die set downwardmost.

26. In combination in a machine for assembling and trying out dies, means including a horizontal support adapted to have the second member of an assembled die set comprising first and second members disposed thereon, a first means vertically adjustable and rotatable about a horizontal axis, said first means adapted to have the first member of said die set secured thereto and to raise the assembled die set from said horizontal support and rotate it on a horizontal axis to dispose it with its members in superimposed relation but with its second member uppermost, an upright at one side of said support, a beam on said upright and mounted thereby for turning movement about a horizontal plane to dispose its selected end portion over an assembled die set being held in the described superimposed relation by said first means, a second means vertically adjustable on one end of said beam, said second means adapted when said end of the beam is over said support to be attached to the second member of said die set and then to be vertically adjusted and swing with said beam on said vertical axis to lift said second member of the die set from the first member thereof and carry said second member to a position laterally of the first member of the die set and to dispose the other end portion of said beam over the platen supported first member of said die set, a tool holder, means mounting said tool holder on said other end portion of said beam, said beam also longitudinally adjustable in addition to being rotatable on said vertical axis whereby to dispose said tool holder over the selected upwardly facing surface portion of said platen supported first member, said tool holder vertically adjustable on said beam toward and from such selected portion of the platen supported first member to bring a tool against any selected portion of the latter and to move the tool therefrom, means for rotating said tool holder while the same is positioned to bring a tool against such selected portion of said first member, said beam then swingable about said vertical axis to bring the second means and the second member back to position with the second die set member over the first member, said second means then operable to lower said second member into its initial position on the first member, said first means then operable to swing the reassembled die set back to a position over said support with said second member lowermost and to then lower the reassembled die set onto said support.

27. In a machine for assembling and trying out dies, a beam, means mounting said beam for turning movement about a vertical axis, a horizontal bed below the plane of said beam and adapted to have a die set disposed thereon, a tool holder mounted on one end portion of said beam, a lifting device mounted on the other end portion of said beam, said beam turnable about said vertical axis to dispose a selected end portion of the beam over said horizontal bed, said lifter device adapted when one end portion of the beam is over said bed to be attached to a die member of a set on said bed, means for then operating said lifter to raise said die member to which the lifter is attached, said beam then rotatable on said vertical axis to dispose its other end portion over said horizontal bed, said beam being longitudinally adjustable in addition to being adjustable about said vertical axis whereby the tool holder on said other end portion of the beam may be disposed over the selected portion of a die member remaining on said horizontal bed when said lifter has moved the uppermost die member of a set on the bed from the lowermost thereof, means on said beam for driving said tool holder and thus any tool carried thereby, means for adjusting said tool holder vertically downwardly with respect to said beam to bring a tool carried by the holder against the selected portion of said die member and for then raising said tool holder to raise the tool away from said die member, said beam then turnable about said vertical axis to dispose the removed die member over the unmoved die member on said horizontal bed, and said lifter device then adjustable vertically downwardly to reposition said lifted die member in its initial position on the unmoved die member.

28. In a machine for assembling and trying out die sets, a base supporting a horizontal bed, vertical ways at the respective ends of said bed, posts vertically movable in said ways, a platen over said bed, means mounting said platen on said posts for vertical movement therewith and comprising pivot means mounting said platen on said posts for turning movement relative thereto about a horizontal axis, a block rigid with said platen and turnable therewith about said horizontal axis, said block having recesses all radially of the center of said pivot means and concentric with such center, a bolt movable with and slidable on one of said posts into and out of a selected one of said recesses for locking said platen in a selected position of adjustment about said horizontal axis and for releasing said platen, and means for raising and lowering said posts in said ways to move said platen toward and from said bed.

29. In a machine for assembling and trying out die sets, a base supporting a horizontal bed including front and rear edges and a pair of ends, vertical ways at the respective ends of said bed, posts vertically movable in said ways, a platen over said bed and having front and rear edges and a pair of ends, means mounting said platen on said posts for vertical movements therewith and comprising pivot means located midway the front and rear edges of said platen and mounting the latter on said posts for turning movement relative thereto about a horizontal axis, means inculding a worm and worm gear for turning said platen about said horizontal axis relative to said posts, a block rigid with said platen and turnable with the platen about said axis, said block having recesses all located radially of the center of said pivot means and concentric therewith, a bolt slidable on one of said posts into a selected one of said recesses for locking said platen in a selected position of adjustment about said horizontal axis and for sliding movement out of said recess for releasing said platen for movement about said axis, and means for raising and lowering said posts in said ways to move said platen away from and toward said bed.

30. In a machine for assembling and trying out die sets, a base supporting a horizontal bed adapted to have an assembled die set disposed thereon, a vertical post at a pair of opposite sides of said base, means mounting said posts for vertical movements on said base, a platen over said bed and adapted to have the punch holder of such die set secured thereto, means mounting said platen on said posts for vertical movement therewith to move the punch holder of such die set from the bed thereof and for turning movement relative to said base about a horizontal axis to invert the position of such punch holder and face its tool mounting surface upwardly, means for moving said posts in unison to move said platen from and toward said bed to carry a punch holder which is secured to the platen from and toward the bed of a die set on said horizontal bed, means for turning said platen about said horizontal axis when said platen has been moved and has moved a punch holder upwardly from a die set on said horizontal bed, a beam, means mounting said beam in a position above the highest position to which a punch holder may be moved and inverted by said platen, a tool holder on said beam, means mounting said beam for turning movement about a vertical axis located at the rear side of said base and a longitudinal movement toward and from the front side of said base whereby to dispose said tool holder over the selected portion of the upwardly facing tool mounting surface of a punch holder being held in inverted position by said platen, means for moving said tool holder vertically downwardly relative to said beam to engage a tool held by said tool holder with the selected portion of said surface and for then moving said tool holder upwardly to carry such tool from such punch holder, said means for turning said platen about a horizontal axis then operable to invert the platen and place the punch holder in position with its originally lower side in opposed relation with the upper side of the bed of the die set, and said means for moving said posts in unison then operable to lower said posts and platen to lower the punch holder into its initial position on the die set.

31. In combination in a machine for assembling and trying out die sets, a horizontal support having a die set including first and second members, means above said support for raising the first member off the second member and for then rotating said first member through substantially 180° to invert it and face its former lower side upwardly, a beam, a tool holder on said beam, means mounting said beam for pivotal movement about a vertical axis and for longitudinal adjustment to position said tool holder over any selected portion of the upwardly facing side of said inverted first member to position a tool carried by said tool holder over such selected portion of the upwardly facing side of said inverted first member, means for driving said tool holder, means for lowering and raising said tool holder in a straight line movement to carry a tool mounted thereby to and from such selected portion of the upwardly facing side of said inverted first member, and said first mentioned means then invertible to return said first member to position over the second member and to then lower said first member into its initial position on said second member.

32. In a machine for assembling and trying out dies, a base, a horizontal support on said base and adapted to have the second member of a die set including superimposed first and second members disposed thereon and to have the second of said members secured thereagainst, a platen above said support and adapted to have the first of said members secured to its under side while said members are superimposed and disposed on said support with said first member uppermost, means for raising said platen with respect to said support to separate said die members, said platen mounted for rotation about a horizontal axis, means for rotating said platen about said axis through 180° to invert said first member and support it in inverted position, a tool holder, a beam, means mounting said tool holder on said beam, means mounting said beam for adjustment about a vertical axis and for longitudinal adjustment to locate said tool holder over any selected portion of the upwardly facing side of said inverted first member to position a tool carried by said tool holder over such selected portion of the upwardly facing side of said inverted first member, means for driving said tool holder, means for lowering and raising said tool holder in a straight line movement to carry a tool mounted thereby to and from such selected portion of the upwardly facing side of said inverted member, said first mentioned means then invertible to return said platen and first member to a position over the second member, and said second mentioned means invertible to then lower said platen to replace said first member in its initial position on said second member.

33. In combination in a machine for assembling and trying out dies, a horizontal support for a die set including first and second members, means for raising the first member off the second member and for then rotating the said first member through substantially 180° to invert it and face its former lower side upwardly, means comprising rigid parts of said machine located to guide movements of the first mentioned means during such raising movement, a tool holder, means movably mounting said tool holder for adjustment in a horizontal plane only to a position over any selected portion of the upwardly facing side of said inverted first member to position a tool carried by the tool holder over such selected portion of the upwardly facing side of said inverted first member, means for driving said tool holder, means for causing relative straight line vertical movements between said tool holder and inverted first member to cause working engagement between a tool carried by said tool holder and work on such selected portion of the upwardly facing side of said inverted first member and to separate such a tool and said member, and said first mentioned means then operable to return the first member to position over the second member and to lower said first member into its initial position on said second member.

34. In a machine for assembling and trying out dies, a base, a horizontal support on said base and adapted to have the second member of a die set including superimposed first and second members disposed thereon and to have the second of said members secured thereagainst, a platen above said support and adapted to have the first of said members secured to its underside while said members are superimposed and disposed on said support with said first member uppermost, means for raising said platen with respect to said support to separate said die members, said platen mounted for rotation about a horizontal axis, means for rotating said platen about said axis through 180° to invert said first member and support it in inverted position, a tool holder, means movably mounting said tool holder for adjustment to a position over any selected portion of the upwardly facing side of said inverted first member to position a tool carried by said tool holder over such selected portion of the upwardly facing side of said inverted first member, means for driving said tool holder, means for causing relative straight line vertical movement between said tool holder and inverted first member to cause working engagement between a tool carried by said tool holder and work on such selected portion of the upwardly facing side of said inverted first member and to separate such a tool and said member, and said first mentioned means then operable to return the first member to position over the second member and to lower said first member into its initial position on said second member.

35. In combination in a machine for assembling and trying out die sets, a horizontal support having a die set including first and second members, means above said support for raising the first member off the second member and for then rotating said first member through substantially 180° to invert it and face its former lower side upwardly, a beam, a tool holder on said beam, means mounting said beam for pivotal movement about a vertical axis and for longitudinal adjustment to position said tool holder over any selected portion of the upwardly facing side of said inverted first member to position a tool carried by said tool holder over such selected portion of the upwardly facing side of said inverted first member, means for driving said tool holder, means for causing relative straight line vertical movement between said tool holder and inverted first member to cause working engagement between a tool carried by said tool holder and work on such selected portion of the upwardly facing side of said inverted first member and to separate such a tool and said member, and said first mentioned means then operable to return the first member to position over the second member and to lower said first member into its initial position on said second member.

36. In a machine for assembling and trying out dies, a base, a horizontal support on said base and adapted to have the second member of a die set including superimposed first and second members disposed thereon and to have the second of said members secured thereagainst, a platen above said support and adapted to have the first of said members secured to its under side while said members are superimposed and disposed on said support with said first member uppermost, means for raising said platen with respect to said support to separate said die members and for rotating said platen through 180° to invert said first member and support it in inverted position, a tool holder, a beam, means mounting said tool holder on said beam, means mounting said beam for adjustment about a vertical axis and for longitudinal adjustment to locate said tool holder over any selected portion of the upwardly facing side of said inverted first member to position a tool carried by said tool holder over such selected portion of the upwardly facing side of said inverted first member, means for driving said tool holder, means for causing relative straight line vertical movement between said tool holder and inverted first member to cause working engagement between a tool carried by said tool holder and work on such selected portion of the upwardly facing side of said inverted first member and to separate such a tool and said member, and said first mentioned means then operable to return the first member to position over the second member and to lower said first member into its initial position on said second member.

37. In a machine for assembling and trying out die sets, a base supporting a horizontal bed, vertical ways at a pair of opposite sides of said base, posts vertically movable in said ways, attaching means mounted on said posts and constructed to support work between said posts, the means mounting said attaching means on said posts for vertical movement therewith and comprising pivot means mounting said attaching means for movement relative thereto about a horizontal axis, a block rigid with said attaching means and turnable therewith about said horizontal axis, said block having recesses all radially of the center of said pivot means and concentric with such center, a bolt movable with and slidable on one of said posts into and out of a selected one of said recesses for locking said attaching means in a selected position of adjustment about said horizontal axis and for releasing said attaching means, and means for raising and lowering said posts in said ways to move said attaching means toward and from said bed.

RICHARD F. MOORE.

REFERENCES CITED

The following references are of record in the file of this patent:

UNITED STATES PATENTS

| Number | Name | Date |
|---|---|---|
| 504,289 | Vanderbeck et al. | Aug. 29, 1893 |
| 557,004 | Mill | Mar. 24, 1896 |
| 1,515,620 | Runnels | Nov. 18, 1924 |
| 1,645,906 | Hansen | Oct. 18, 1927 |
| 1,669,845 | Valentine | May 15, 1928 |
| 1,766,115 | Einstein | June 24, 1930 |
| 1,992,314 | Laussucg | Feb. 26, 1935 |
| 2,102,655 | Strawn | Dec. 21, 1937 |
| 2,248,464 | Richard et al. | July 8, 1941 |
| 2,475,692 | Borzym | July 12, 1949 |
| 2,475,693 | Borzym | July 12, 1949 |